United States Patent [19]

Hutchins

[11] Patent Number: 5,208,897
[45] Date of Patent: May 4, 1993

[54] METHOD AND APPARATUS FOR SPEECH RECOGNITION BASED ON SUBSYLLABLE SPELLINGS

[75] Inventor: Sandra E. Hutchins, Del Mar, Calif.

[73] Assignee: Emerson & Stern Associates, Inc., San Diego, Calif.

[21] Appl. No.: 589,646

[22] Filed: Sep. 28, 1990

Related U.S. Application Data

[63] Continuation-in-part of Ser. No. 570,459, Aug. 21, 1990.

[51] Int. Cl.⁵ .............................................. G10L 9/00
[52] U.S. Cl. ....................................................... 395/2
[58] Field of Search .................................. 381/41–46; 395/2

[56] References Cited

U.S. PATENT DOCUMENTS

| | | | |
|---|---|---|---|
| 4,277,644 | 7/1981 | Levinson et al. | 381/43 |
| 4,581,756 | 4/1986 | Togawa et al. | 381/43 |
| 4,665,548 | 5/1987 | Kahn | 381/43 |
| 4,696,042 | 9/1987 | Goudie | 381/41 |
| 4,833,712 | 5/1989 | Bahl et al. | 381/43 |
| 4,852,180 | 7/1989 | Levinson | 381/43 |
| 4,888,823 | 12/1989 | Nitta et al. | 381/43 |
| 4,975,959 | 12/1990 | Benbassat | 381/43 |
| 4,980,917 | 12/1990 | Hutchins | 381/42 |
| 4,994,966 | 2/1991 | Hutchins | 364/419 |
| 4,996,707 | 2/1991 | O'Malley et al. | 381/52 |

Primary Examiner—Michael R. Fleming
Assistant Examiner—Michelle Doerrler
Attorney, Agent, or Firm—Burns, Doane, Swecker & Mathis

[57] ABSTRACT

In a digital computer, a method for speech recognition includes steps of sampling a speaker's speech and providing speech data sample segments of predetermined length at predetermined sampling intervals based on changes in energy in the speech. Cohesive speech segments, which correspond to intervals of stable vocoids, changing vocoids, frication, and silence, are identified from the speech data sample segments, and are assigned frames of subsyllables. Each cohesive segment corresponds to at least one respective frame, and each frame includes at least one of a plurality of subsyllables that characterizes predetermined gross and fine phonetic attributes of the respective cohesive segment. The subsyllables are located in a first lookup table mapping sequences of subsyllables into syllables, and the syllables are combined into words by locating words in another lookup table. The conformance of sequences of the words to a set of predetermined checking rules is checked, and a recognition result is reported. Apparatus implementing the method are also disclosed.

19 Claims, 38 Drawing Sheets

Microfiche Appendix Included
(119 Microfiche, 2 Pages)

PHONEMIC ALPHABET

| Vowels | Glides | Stops | Fricatives |
|---|---|---|---|
| i bEEt | y Yet | p Pig | s Sing |
| I bIt | w Wet | b Big | z Zoo |
| e bAIt | W WHet | t Top | S SHove |
| E bEt | | d Dig | Z meaSure |
| A bAt | Liquids | k Key | f File |
| a fAther | R Road | g Give | v Very |
| O bOUght | r buttER | K Cold | Q THin |
| o cOAt | L Lamp | G Got | q THese |
| U pUt | l middLE | | h Hot |
| u bOOt | | Affricates | |
| & bUt | Nasals | tS CHurCH | |
| Y 'high' & | m MoM | dZ JuDGe | |
| | n NoNe | | |
| | N saNG | | |

Non Speech
\# inhale
% exhale
\* other noise

Special
(paired with vowel)
x some nasality e.g. /ix/
X strongly nasal e.g. /iX/
H whispered e.g. /aH/

FIGURE 9

$$\begin{matrix}\text{FREQUENCY}\\\text{COMM\_1}\\\text{UNIFORM}\\\text{U-H-F}\end{matrix}\Big\}\left\{\begin{matrix}2\left\{\begin{matrix}20\ \{5\text{-}9\}\\30\text{-}90\ (1\text{-}9)\end{matrix}\right\}\\3\left\{\begin{matrix}\text{OH}\ \{\text{OH-9}\}\\\text{TEENS}\\20\text{-}90\ (1\text{-}9)\end{matrix}\right\}\end{matrix}\right\}\left\{\begin{matrix}\text{POINT}\\\text{DECIMAL}\end{matrix}\right\}\{\text{OH, 0-9}\}$$

$$\begin{matrix}\text{FREQUENCY}\\\text{COMM\_2}\\\text{VICTOR}\\\text{V-H-F}\end{matrix}\Big\}1\left\{\begin{matrix}\text{TEENS}\\\{20\text{-}50\}\ (1\text{-}9)\\\text{OH}\ \{\text{OH},0\text{-}9\}\\\{0\text{-}9\}\{\text{OH},0\text{-}9\}\end{matrix}\right\}\left\{\begin{matrix}\text{POINT}\\\text{DECIMAL}\end{matrix}\right\}\left\{\begin{matrix}\{10,12,15,17\}\\\{20\text{-}90\}\ (2,5,7)\\\text{OH}\ \{\text{OH},0,2,5,7\}\\\{0\text{-}9\}\{\text{OH},0,2,5,7\}\end{matrix}\right\}$$

$$\text{I-L-S}\ \ 1\left\{\begin{matrix}\{\text{OH, 0, 1}\}\ \{8\text{-}9\}\\\{10,\ 11\}\end{matrix}\right\}\left\{\begin{matrix}\text{POINT}\\\text{DECIMAL}\end{matrix}\right\}\{\text{OH, 0-9}\}$$

$$\begin{matrix}\text{BUTTON}\\\text{CHANNEL}\end{matrix}\Big\}\left\{\begin{matrix}(\text{OH, 0-9})\ \{1\text{-}9\}\\\text{TEENS}\\20\end{matrix}\right\}$$

$$\text{TACAN}\left\{\begin{matrix}0\\1\end{matrix}\right\}\left\{\begin{matrix}\text{TEENS}\\20\ \ \ \ \ \ \ \ \ (1\text{-}6)\\2\ \ \ \ \ \ \ \ \{\text{OH, 0-6}\}\\\{\text{OH, 0-1}\}\ \{\text{OH, 0-9}\}\end{matrix}\right\}$$

$$\begin{matrix}\text{I-F-F}\\\text{SQUAWK}\end{matrix}\Big\}\left\{\begin{matrix}\{\text{OH, 0-7}\}\ \{\text{OH, 0-7}\}\ \{\text{OH, 0-7}\}\ \{\text{OH, 0-7}\}\\\{10\text{-}17\}\left\{\begin{matrix}\{10\text{-}17\}\\\{\text{OH, 0-7}\}\ \{\text{OH, 0-7}\}\\\{20\text{-}70\}\ (1\text{-}7)\end{matrix}\right\}\\\{20\text{-}70\}\ (1\text{-}7)\left\{\begin{matrix}\{10\text{-}17\}\\\{\text{OH, 0-7}\}\ \{\text{OH, 0-7}\}\\\{20\text{-}70\}\ (1\text{-}7)\end{matrix}\right\}\end{matrix}\right\}$$

FIGURE 10A

| COMMANDS | NUMBERS |
|---|---|
| | ZERO |
| | ONE |
| SQUAWK | TWO |
| I_F_F | THREE |
| | FOUR |
| TACAN | FIVE |
| | SIX |
| I_L_S | SEVEN |
| | EIGHT |
| BUTTON | NINE |
| CHANNEL | |
| | |
| FREQUENCY | THIRTEEN |
| COMM_1 | FOURTEEN |
| COMM_2 | FIFTEEN |
| VHF | SIXTEEN |
| UHF | SEVENTEEN |
| VICTOR | EIGHTEEN |
| UNIFORM | NINETEEN |
| | THIRTY |
| | FORTY |
| | FIFTY |
| | SIXTY |
| | SEVENTY |
| | EIGHTY |
| | NINETY |
| | |
| | POINT |
| | DECIMAL |

FIGURE 10B

PRINTER PORT CONNECTOR
REAR VIEW

| PIN | FUNCTION | |
|-----|------|------|
| 1 | HSKO | HANDSHAKE OUT |
| 2 | HSKI | HANDSHAKE IN |
| 3 | TXD- | TX DATA MINUS |
| 4 | GROUND | |
| 5 | RXD- | RX DATA MINUS |
| 6 | TXD+ | TX DATA PLUS |
| 7 | GPI | NOT USED |
| 8 | RXD+ | RX DATA PLUS |

Each Transmission:

<LF> A <v/e> <synth. string> <CR> where

<LF> = line feed = hex 0A

A = ASCII 'A' = hex 41

<v/e> = voice enable byte
= xxxx1xxx for PTT ON
= xxxx0xxx for PTT OFF

<synth. string> = bytes not used by SimSys

<CR> = carriage return = hex 0D

FIGURE 15A

EACH TRANSMISSION:
  <LF> <MSG STATUS> <3 BYTE ID>...<3 BYTE ID> <CR>
WHERE
<LF> = LINE FEED = HEX 0A
<MSG STATUS> = HEX 00
<3 BYTE ID> =
        HEX FF FF FF = ALTERNATE DELIMITER
    OR
        3 BYTES ON ASCII '0' TO '9' (HEX 30 TO 39)
        GIVING INDEX IN NT.LIST FOR THE RECOGNIZED
        WORD.
EXAMPLE:
SCREEN DISPLAY:
( TACAN ONE ZERO NINE
/TACAN ONE ZERO FIVE
/)

MESSAGE OUT (ASCII):
<LF> <00> 066 053 087 044
<FF> <FF> <FF> 066 053 087 029
<FF> <FF> <FF> <CR>

MESSAGE OUT (HEX):
<LF> 00 30 36 36  30 35 33  30 38 37 30 34 34
FF FF FF 30 36 36 30 35 33 30 38 37 30 32 39
FF FF FF <CR>

WHERE TACAN =066, ONE =053, ZERO=087, NINE=044,
      FIVE =029

FIGURE 15B

DISPLAY PAGE

= FORWARD BY 1 SEC= 1 LINE
+ FORWARD BY 2 SEC= 2 LINES
- BACK BY 1 SEC= 1 LINE (MINUS)
_ BACK BY 2 SEC= 2 LINES (UNDERLINE)

CURSOR

. (PERIOD) FORWARD BY 1 PIXEL
> FORWARD BY 25 PIXELS
, (COMMA) BACK BY 1 PIXEL
< BACK BY 25 PIXELS
/ TOGGLE TRACK

PLAYBACK a PLAY 0.5 SEC FROM CURSOR
A PLAY 1 SEC FROM CURSOR
P PLAY MARKED INTERVAL

MARK INTERVAL
I OR i START/END WORD INTERVAL
R REMOVE INTERVAL

FILE I/O
S SAVE MARKED WORDS
L LOAD NEXT SPEECH FILE

FIGURE 17B

```
                  ┌─PROGRAM DATE AND VERSION─┐
cm5wf2[2/12/90|180paths&EndBlocks|V1.9] : speech
file[clover-D to exit]:   initializing grammar F1,and F2
File:.../groupa/artcn100.1025 ◄──────── FILE BEING PROCESSE
* ){3}** ){1}= SW ){1}* ){2}= SW ){1}
                                      ─── LINGUIST'S WORD MA
[[TACAN]]! C^ ){2}Vn Vi Vx ){6}! k ){22}% C^ C^n ){29}VA Va Vx
){45}! w ){35}% Cv^ Cv^A ){46} @ D ){58}VA Ve Vx T Ts ){62}%
C^u ){57}Vn VI Vx ){87}Vr Vu Vx ){81}Va Vzr Vx ){52}Va Vzr V
){50}! Cv Cvn ){48} @ D ){43}              ─── SUBSYLLA
                                              FRAMES
[[ONE]] Vn Vx ){49}Vn Vzu Vx ){48}= Vn ){54}! w ){60}% C^ C^n
){91}Vo Vzu Vx ){144}Va Vo Vx ){161}! Cv Cvu ){97} @ D ){116
[[ZERO]] Vu Vzn Vx ){124}= Vn ){84}TF TFs ){85}= TF TFs ){37}
){37}% C^ C^n ){67}Vu Vzn Vx )*{103}Vu Va Vx )*{171}Vr Va V
){177}Va Vo Vx ){104}! Cv Cvu ){69}  OVERFLOW  NUMBER (
                                      SYMBOL   ACTIVE PA
[[ZERO]] TFs ){86}= TFs ){13}! w ){13}% C^ ){33}Vr Va Vx ){49}
Vza Vx ){99}Va Vr Vx ){77}Va Vzr Vx ){47}Vn Vu Vx ){39}Vn V
Vx ){36}= Vn ){36}! Cv Cvn ){38}* ){47}** ){8}= SW ){1}
(TACAN ONE ZERO ZERO [10: tacan o.k.]◄──── RECOGNIZER
/)                                          OUTPUT
```

FIGURE 17C

Option Symbols
= Remainder of frame can be ignored with penalty = 0
@ Remainder of frame can be ignored with penalty = 1
! Remainder of frame can be ignored with penalty = 2
% Remainder of frame can be ignored with penalty = 3

Silence
@ # ) very small gap (30-60 ms)
) small gap (60-150 ms)
) large gap (>150 ms)

Stable Vowels/Nasals
Primary: Vi  Vl  Ve  VE  VA  VY  V&  Va  Vo  Vu  Vr  Vn
Secondary: Vzi Vzl Vze VzE VzA VzY Vz& Vza Vzo Vzu Vzr Vzn
Default Vowel: Vx

Fricatives
Primary:
F    Fs                    Secondary:
TF   TFs                      Fz    Fzs
T    Ts                       TzF   TzFs
(@T)                          Tz    Tzs \>110 ms
40-110 ms
20-40 ms
<20 ms

FIGURE 17D

Basic Change Intervals
C^   Amplitude Rising
Cv   Amplitude Falling
C^v  Amplitude Rises then Falls
Cv^  Amplitude Falls then Rises

Change Intervals with Phonetic Estimates

| | | | | | | | | | | |
|---|---|---|---|---|---|---|---|---|---|---|
| C^I | C^i | C^e | C^E | C^A | C^Y | C^& | C^a | C^o | C^u | C^r | C^n |
| CvI | Cvi | Cve | CvE | CvA | CvY | Cv& | Cva | Cvo | Cvu | Cvr | Cvn |
| C^vI | C^vi | C^ve | C^vE | C^vA | C^vY | C^v& | C^va | C^vo | C^vu | C^vr | C^vn |
| Cv^I | Cv^i | Cv^e | Cv^E | Cv^A | Cv^Y | Cv^& | Cv^a | Cv^o | Cv^u | Cv^r | Cv^n |

Change Interval Modifiers
K   very sharp onset in following change
k   sharp rise in following change
q   onset wavers in following change
w   very weak rise in following change
D   sharp fall in preceding change

FIGURE 17E

```
thir (1) teen : thrn      THIR CAUSES TRANSITION
                          FROM STATE (0) TO STATE (1)
                          IN STATE(1) TEEN CAUSES OUTPUT
                          OF THIRTEEN THEN RESET TO (0)
*    (1) ty : trty        IN STATE(1) TY CAUSES OUTPUT
                          OF THIRTY THEN RESET TO (0)
--             thir- is not a word w/o -ty or -teen
*    (1) X : [dp]         IN STATE(1) ANYTHING OTHER THAN
-                         TY OR TEEN CAUSES PATH DROP
four (2) teen : frtn
*    (2) ty :L frty       COMMENTS START WITH A HYPHEN
--             four is free standing, so pass it to f2
*    (2) X : [rw1]
-                         RESET WITH 1 NON-TERMINAL, I.E.
                          OUTPUT FOUR, RESET TO (0),
fif (3) teen : fftn       THEN REPROCESS CURRENT
*    (3) ty : ffty        NON-TERMINAL
*    (3) X : [dp]
-
six (4) teen : sstn       SIX + TEEN = SIXTEEN
*    (4) ty : ssty        SIX + TY = SIXTY
*    (4) X : [rw1]
                          ELSE OUTPUT SIX THEN
                          REPROCESS CURRENT
                          NON-TERMINAL
```

FIGURE 18A

*STATE DEFINITION*

BUTN: - saw BUTTON, CHANNEL at SOM -- 0-20
oh BUT1
zero BUT1 ———— ZERO CAUSES TRANSITION
one BUT1           FROM BUTN TO BUT1
-2 to FB2 3-9,teens and 20 to final state
two FB2
thri FBUT           COMMENTS START
                    WITH A HYPHEN
...
nine FBUT
ten FBUT ...
twen FBUT
---------start of errors for BUTN
trty ER7 : {bs} ————THIRTY CAUSES ERROR
                    TRANSITION TO STATE ER7
...
butn ER7 : {bs}
skwk ER7 : {bs}         OK TO END COMMAND
*BUT1: - saw BUTTON oh, 0,1   IN STATE BUT1
oh FBUT
zero FBUT
one FBUT
two FBUT

FIGURE 18B

72 States   2546 Transitions
Max transitions per state = 47
Packed table size is 8634 bytes!
All Done with f2gd.PKD State Numbers Assigned

| | | | |
|---|---|---|---|
| 0:SOM | 1:TAC | 2:ILS | 3:SKWK |
| 4:ER | 5:TAC0 | 6:TAC1 | 7:CANC |
| 8:ER1 | 9:TC2A | 10:FTAC | 11:TC2B |
| 12:TC2D | 13:TC2C | 14:TACH | 15:ER2 |
| 16:D1 | 17:FN2 | 18:D12 | 19:ER3 |
| 20:D3 | 21:FSQK | 22:D34 | 23:ER4 |
| 24:ILS1 | 25:ER5 | 26:IL2A | 27:IL2B |
| 28:IL3 | 29:ILH | 30:PONT | 31:CONC |
| 32:FILS | 33:ER6 | 34:UHF | 35:BUTN |
| 36:FRE | 37:VHF | 38:VHF1 | 39:UH2 |
| 40:UH3 | 41:ER13 | 42:BUT1 | 43:FB2 |
| 44:FBUT | 45:ER7 | 46:ER8 | 47:ER9 |
| 48:VH1Z | 49:VH1C | 50:VH1E | 51:FVHF |
| 52:VH1D | 53:VH1F | 54:VH1H | 55:PNT2 |
| 56:FVFH | 57:PONG | 58:FVHD | 59:POND |
| 60:ER10 | 61:ER11 | 62:UH2A | 63:UH2B |
| 64:UH2C | 65:UH2H | 66:UHP | 67:PNT3 |
| 68:UH3D | 69:UH3H | 70:FUH | 71:ER12 |

FINISHED PACKING F2 TABLE: f2gd.PKD

FIGURE 19A

[32: ils o.k.]
[33: ils: err after point]
[34: uhf what?]
[35: button what?]
[36: freq what?]
[37: vhf what?]
[38: Incomplete vhf]
[39: Incomplete uhf freq]
[40: Incomplete uhf freq]
[41: bad # for uhf freq]
[42: button o.k.]
[43: button o.k.]
[44: button o.k.]
[45: bad    #button]
[46: too many #s after button]
[47: bad # for vhf]
[48: Incomplete vhf]
[49: Incomplete vhf]
[50: Incomplete vhf]
[51: Incomplete vhf]
[52: Incomplete vhf]
[53: Incomplete vhf]

FIGURE 19B

STOPS AND FRICATIVES: MOST COMMON REALIZATIONS

| PHONEME(S) | SYLLABLE/WORD/PHRASE POSITION | | |
|---|---|---|---|
| | INITIAL | MEDIAL | FINAL |
| /s/ /S/ | (Fs/TFs) C^ | (/Cv)(Fs/TFs)(/C^) | (/Cv) (Fs/TFs) |
| /f/ /Q/ | (F/TF/T/SW) C^ | Cv(F/TF/T/#)C^ | Cv (F/TF/T/#) |
| /t/ | SW(Ts/TFs)(k/K)C^<br>SW(T/TF)(k/K)C^ | Cv #(/T/Ts)(k/K)C^ | Cv(/D)#((/T/Ts/TF) |
| /p/ /k/ | SW(/T/TF)(/k/K)C^ | Cv #(/T)(k/K)C^ | Cv (/D)#((/T/TF) |
| /b/ /d/ /g/ | SW((/T)(/k)C^ | Cv^<br>Cv #(/k) (/T) C^ | Cv (/D)#((/T/TF) |

FIGURE 20A

| VOCOIDS: MOST COMMON REALIZATIONS | | | |
|---|---|---|---|
| | SYLLABLE/WORD/PHRASE POSITION | | |
| PHONEME(S) | INITIAL | MEDIAL | FINAL |
| /a/ | C^Va | Va$^j$ | Va (/Cv) |
| /ai/ | C^Va$^j$(VA/VE/VI/Vi)$^k$ | Va$^j$(VA/VE/VI/Vi)$^k$ | Va$^j$(VA/VE/VI/Vi) Cv$^k$ |
| /n/ /m/ | C^Vn (/w) C^ | Cv^n (/Cv) Vn (/C^) | Cvn (/Cv) Vn$^j$ |
| /w&/ | Vu$^j$(/w)C^(/Vo)V& | ... | ... |
| /yu/ | (C^Vi/C^i) (/Vi) Vu | ... | ... |

FIGURE 20B

$six SIX
*END6 (/K C^/C^)(Fs/TFs/TFs Fs/T TFs/Ts F/Ts Fs) (/Cv)
*END6 (C^ Ts/Ts #)

$END6
*END2 (/D)  #

$END2
*END2 (Vx/V&)
*END2 (Cv/Cvi)

$END2
-basic start pattern /sl/  ENDX=(FS/TFS/FS T)(/C^)IN
SEV.SRC
*ENDX            (Vx/V&)
*ENDX            (Ve/VE/VI/VY/V&/Vo/Vr/Vi)
*(TFs/Fs/Fs T/TFs Ts/T Ts/TFs T/Ts #)(C^i/C^e)
(Ve/VE/VI/Vi)
*(TFs/Fs/Fs T/TFs Ts/T Ts/TFs T/Ts #) (C^i/C^e) (VY/Vr)
-very weak vowel
*(Fs/TFs/Fs T/TFs Ts/T Ts/TFs T/Ts #) C^v
*(Fs/Fs T) Cv^
*(TFs/Ts) Cv^
*(Fs/TFs/Fs T/TFs Ts) Cv
*(Fs/TFs/Ts) Cvl
*(Fs/TFs) Cvl $END6
-forms without gap
*(Fs/Fs T) C^v
*(TFs/Ts) C^v
*(Fs/Fs T) Cv^
*(TFs/Ts) Cv^

FIGURE 21

| END name | Phonetic Path | Used In |
|---|---|---|
| ENDM | (/n)b& | button |
| ENDD | (/n)b&! | button |
| END? | (/n)b&!(/&)n | button |
| ENDo | (/n) | button,tacan,nine |
| ENDX | s | squawk,-cy,-chef,six, seven, zero |
| ENDN | sk(/w) | squawk |
| ENDY | (sk(/w)/s)O | squawk |
| ENDP | (/n)tA | tacan |
| ENDa | (d/t/Q/p) | tacan,freq-comm,point, decimal,two,ty,teen |
| ENDR | (t/k) | tacan,comm two,ty,teen |
| ENDO | (/n)tAk(/A) | tacan |
| ENDT | (/n)tAkA(/n) | tacan |
| ENDU | a(/E) | ils |
| ENDV | a(/E)lE | ils |
| END9 | fE | -fef |
| END8 | ai | ie- |
| ENDm | aiE | ie- |
| END@ | si | -cy |
| END5 | (Q/f) | freq-,three |
| ENDB | (Qr/fr) | freq-,three,thirty |
| ENDl | fri | freq- |
| ENDf | vi(/E) | ve(V_),victor |
| ENDg | (i/y) | ue(U_) |
| ENDh | yu | ue(U_) |
| ENDi | yue | ue(U_) |
| ENDd | tS | chef(_H_F) |

FIGURE 22A

| END name | Phonetic Path | Used In |
|---|---|---|
| ENDe | tSE | chef(_H_F),channel |
| ENDb | ka | comm |
| ENDc | kan | comm |
| ENDc | kan | comm |
| ENDn | (i/u) | uni- |
| ENDI | f(a/o)(/n) | -form |
| ENDj | vIk | victor |
| ENDk | vIktr | victor |
| ENDp | tSAn(/l) | channel |
| ENDW | po(/i) | point |
| ENDq | des | decimal |
| ENDA | w% | one |
| END& | w&n | one |
| ENDS | ti | two |
| END= | t(/i)u | two |
| END4 | (Qr | three,thirty |
| END3 | Q(r/w)i | three |
| ENDC | fo | four,forty |
| END] | fo | four |
| END_ | fou | four |
| END* | fo(/u)(&/a) | four |
| END^ | fo(/u)(/&/a)r | four |
| ENDE | fa | five |
| ENDF | fai | five |
| END2 | sI | six |
| END6 | sIk | six |
| ENDH | s | seven |
| ENDQ | sE | seven |
| ENDG | sE | seven |

Figure 22B

| ENDname | Phonetic Path | Used In |
|---|---|---|
| END7 | sEv& | seven |
| END+ | sEv(/&)n | seven |
| ENDl | ei | eight,eighty |
| ENDj | na | nine |
| ENDK | na(/i) | nine |
| END% | na(/i)n | nine |
| END< | zl | zero |
| END> | zl | zero |
| END[ | zla | zero |
| ENDL | zl(/a)r | zero |
| ENDO | zl(/a)ro | zero |
| END/ | ti | teen,ty |
| ENDr | tin | teen |

FIGURE 22C

```
echo "file:hd:aztec/tools/subls/gramtools/dogram"
echo "script for converting gram.end to end.packed"
echo "and converting gram.root to gram.packed"
echo "seh 11/18/89 with skips in root&end"
echo "shortnt.list will be junk..every nt in files repeated"
echo "making end list=gram.end"
cat ../skipend > gram.end
cat ../*.end >> gram.end
echo "making root list=gram.root"
cat ../nois.new > gram.root
cat ../skips >> gram.root
cat ../*.root >> gram.root
../mkntsyllist-Ggram.root-Egram.end-Nshortnt.list-Ssyl.list
echo "packing ends"
cat gram.end > gram.list
../gramtools > end.log
rm end.packed
mv gram.packed end.packed
echo "packing roots"
rm gram.list
cp gram.root gram.list
../gramtools > root.log
ls-lt end*root*gram.*
```

FIGURE 23

METHOD AND APPARATUS FOR SPEECH RECOGNITION BASED ON SUBSYLLABLE SPELLINGS

This is a continuation-in-part of the present inventor's co-pending allowed U.S. patent application Ser. No. 07/570,459 filed on Aug. 21, 1990, and entitled "Method and Apparatus for Speech Recognition Based on Subsyllable Spellings.

This application includes a microfiche appendix comprising two (2) microfiche having a total of 119 frames.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

The present invention relates to methods and apparatus for automatic recognition of speech.

Using a psycholinguistic approach to solve the problem of automatic speech recognition ("ASR"), a large vocabulary, speaker-independent, continuous speech recognizer that requires a minimal amount of processing power has been developed.

To date, the standard approach to speech recognition has been to maintain large files of speech spectra, or "templates," and in-coming speech (either words or phonemes) is converted into spectrograms and compared to the templates. If the in-coming speech matches a template, the system "recognizes" that bit of speech. Such an approach requires extensive amounts of memory and processing power to store and search the templates for a match. Since no two speakers sound exactly alike, their spectrograms don't look alike. Using such a template matching system, high recognition accuracy—especially for a vocabulary of more than about twelve words—almost demands speaker-dependence, i.e., the system has to be trained by the individual who wishes to use it.

The present invention provides a speaker-independent, large vocabulary, continuous speech recognizer using relatively limited processing power. The embodiment described below in detail, although directed to use in an aircraft cockpit environment, is significant because it shifts from off-line phonetic recognition to only four-times real-time recognition of a 39-word vocabulary at a 95% phonetic recognition accuracy rate and it uses an approach that had been considered theoretically impossible heretofore. It will be appreciated that, although the embodiment described below is based on a 39-word vocabulary, the invention is not limited in vocabulary size. Other important features of the aircraft cockpit embodiment are:
  continuous speech recognition;
  speaker independent for most dialects of American English;
  command grammar for cockpit functions;
  grammar constrained to valid ranges;
  incorrect speech noted; and
  accuracy tested against digitized database.

The present invention is an innovative approach to the problem of speaker-independent, continuous speech recognition, and can be implemented using only the minimal processing power available on MACINTOSH IIx-type computers available from Apple Computer Corp. The present speaker-independent recognizer is flexible enough to adapt, without training, to any individual whose speech falls within a dialect range of a language, such as American English, that the recognizer has been programmed to handle. It will be appreciated that the present ASR system, which has been configured to run on a Motorola M68030 processor or above, can be implemented with any processor, and can have increased accuracy, dialect range, and vocabulary size compared to other systems. No other speech recognition technology that is currently available or that appears to be on the horizon has these capabilities.

The present invention encompasses the derivation of articulatory parameters from the acoustic signal, the analysis and incorporation of suprasegmental data, and the inclusion of a limited context-free grammar (as contrasted with the finite state grammars typically used in speech recognizers). All elements of this approach are dramatic refutations of limits previously held to be theoretically inviolate. The derivation of articulatory parameters is described in Applicant's U.S. Pat. No. 4,980,917 limited context-free grammars are described in Applicant's U.S. Pat. No. 4,994,996. Both are hereby incorporated by reference. As described further below, phonetic output from a front-end based on technology disclosed in the former patent is translated into words that can be handled by the grammar based on the technology in the latter patent.

The recognition accuracy of the aircraft cockpit embodiment described below was determined by creating a fixed database of real speech against which system performance could be accurately and quickly measured. Among other things, the establishment of a fixed database defined the dialect pool on which recognition could be fairly assessed, since random speakers testing the present recognizer in real-time could easily have—and frequently did have—dialect backgrounds that the system was not prepared to handle. The database provided a relatively quick means of assuring that modifications did not have a serious negative impact on previously well-handled words. In this way, the 95% level of accuracy was met in the aircraft cockpit embodiment on a database of speakers from the Midwest, Texas, California, the Pacific Northwest, the Rocky Mountain states, and parts of the South.

Dialects not represented in the database included the Northeast (both New York and Boston) and the Deep South. Although a database comprising a range of speakers covering the area west of the Mississippi and south of the Mason-Dixon line was intended, a database that was weighted to California and Texas residents was achieved. However, given the highly transient populations in Texas and California—everyone seems to have come from somewhere else—there were relatively few true speakers in the database with Texas and California accents (i.e., people who were born and grew up there).

The collection of data had originally been intended to duplicate as closely as possible the way that users of the recognizer would speak. Hence, many of the speakers in the original database were experienced pilots, thoroughly familiar with the command language used in the cockpit embodiment and accustomed to speaking rapidly. On the other hand, speakers in a demonstration environment may not be familiar with the command language, or may have expectations of permissible speaking rates that were set by other speech recognition technologies. Whatever the cause, it was noted that "demo speakers" spoke much more slowly than pilots, which could lead to straightforward recognizer adjustments to handle the slower speech.

In the aircraft cockpit embodiment described below in detail the fixed database consisted of 45 commands, but because of an insufficient number of speech samples for some of the commands, 95% recognition accuracy was achieved on only 39 commands. Although memory per word is not in itself an overriding concern, the time required to search increased memory contributes directly to processing delays. It will be understood that the present invention is not limited in language or size of vocabulary, but as the vocabulary grows, the per-word memory requirement becomes increasingly important.

SUMMARY

The present invention provides, in a digital computer, a method of recognizing speech, comprising the steps of: entering a cohesive speech segment; determining gross acoustic attributes of the entered segment; determining fine acoustic attributes of the entered segment; assigning at least one SubSyllable to the entered segment based on the gross and fine acoustic attributes determined; repeating the foregoing steps on successive cohesive speech segments to generate at least one sequence of SubSyllables; converting the sequence of SubSyllables into a sequence of syllables by finding the sequence of SubSyllables in a table of predetermined SubSyllable sequences stored in correspondence with syllables and syllable sequences; combining the converted sequence of syllables into words; and verifying the conformance of the words to a first predetermined set of grammatical rules.

The present invention also provides an apparatus for speech recognition comprising: means for entering a cohesive speech segment; means for determining gross acoustic attributes of the entered segment; means for determining fine acoustic attributes of the entered segment; means for assigning at least one SubSyllable to the entered segment based on the gross and fine acoustic attributes determined; means for repeating the foregoing steps on successive cohesive speech segments to generate at least one sequence of SubSyllables; means for converting the sequence of SubSyllables into a sequence of syllables by finding the sequence of SubSyllables in a table of predetermined SubSyllable sequences stored in correspondence with syllables and syllable sequences; means for combining the converted sequence of syllables into words; and means for verifying the conformance of the words to a first predetermined set of grammatical rules.

BRIEF DESCRIPTION OF THE DRAWINGS

The features and advantages of the present invention will be understood by reading the following detailed description in conjunction with the drawings in which:

FIG. 9 illustrates a phonemic alphabet used in an embodiment of the present invention;

FIG. 10A illustrates the grammar used in an aircraft cockpit embodiment;

FIG. 10B shows the vocabulary used in the aircraft cockpit embodiment;

FIG. 15A shows a format for PTT-on and PTT-off signals in the SIMSYST mode;

FIG. 15B shows a format and example for a recognition message between the SIMSYST mode and a simulator host computer;

FIG. 17B shows the commands used for word marking in the CM5WF2 mode;

FIG. 17C shows an output from the CM5WF2 mode;

FIGS. 17D and 17E show symbols used in an output in the CM5WF2 mode;

FIGS. 18A and 18B show source formats for the F1 tool and F2 tool, respectively;

FIG. 19A shows the assignment of state numbers to state names in the aircraft cockpit embodiment;

FIG. 19B shows messages associated with the state numbers;

FIGS. 20A and 20B show typical SubSyllable spellings for common phonemic events;

FIG. 21 shows a source format corresponding to FIG. 8B;

FIGS. 22A, 22B and 22C show ENDings and corresponding phonetic sequences; and

FIG. 23 shows the contents of a DoGram file for the aircraft cockpit embodiment.

DETAILED DESCRIPTION

Overview

Figure 1:
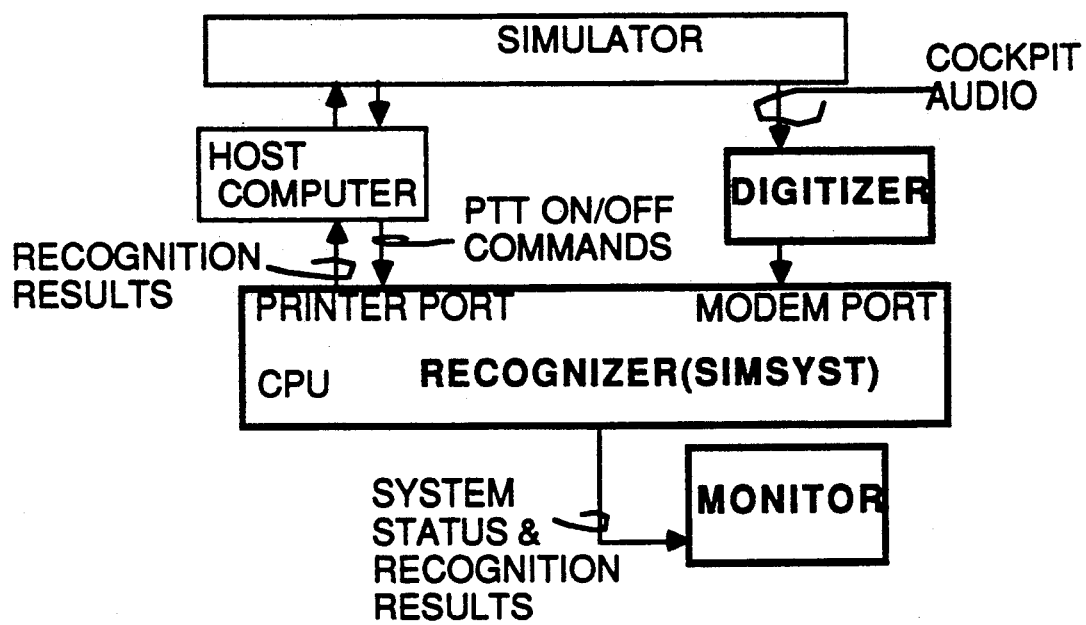
FIG. 1 is a block diagram of the SIMSYST mode of the recognizer.
Figure 2:
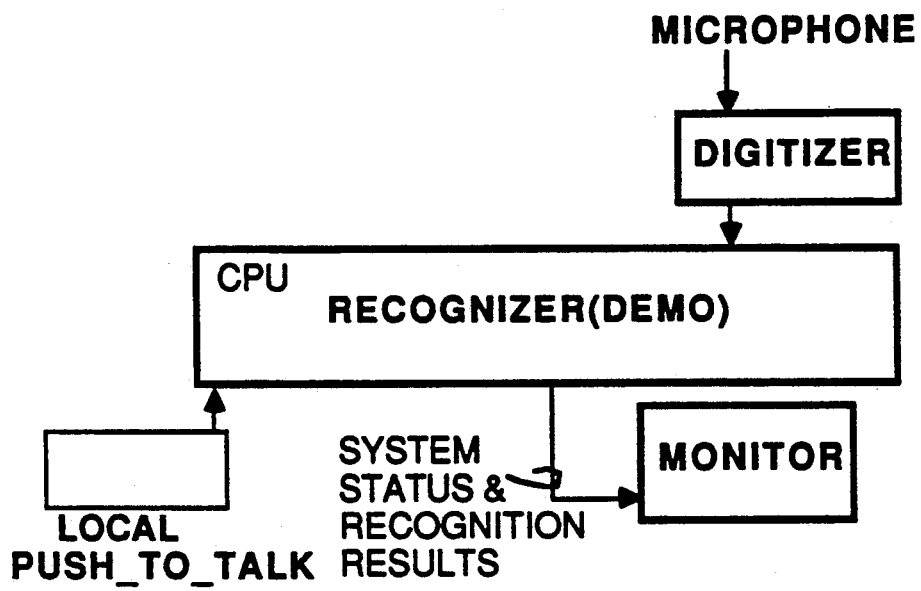
FIG. 2 is a block diagram of the DEMO mode of the recognizer.

As described further below, the present recognition technology was implemented in three table-driven software packages or configurations, each with its own user and system interfaces. The three configurations were SIMSYST, DEMO and CM5WF2 (research). The SIMSYST version of the cockpit embodiment was an on-line mode controlled by a host computer in a flight simulator via an RS-232 link and returned its recognition results to the host over the same link. Local, off-line control was also available for configuring the system. FIG. 1 illustrates the hardware configuration and interfaces for the SIMSYST mode. The DEMO (demonstration) version, shown in FIG. 2, was an on-line mode operated entirely under local (manual) control. It permitted interactive testing with a microphone and local PUSH-TO-TALK (PTT) control, and digitized speech could be saved to a hard disk drive for later analysis or loaded from one for retesting. A separate control panel implemented by the recognizer CPU on the display facilitated changes in system configuration. The DEMO mode Was used for demonstration, evaluation, adding vocabulary words, and analyzing pronunciations.

Figure 3:
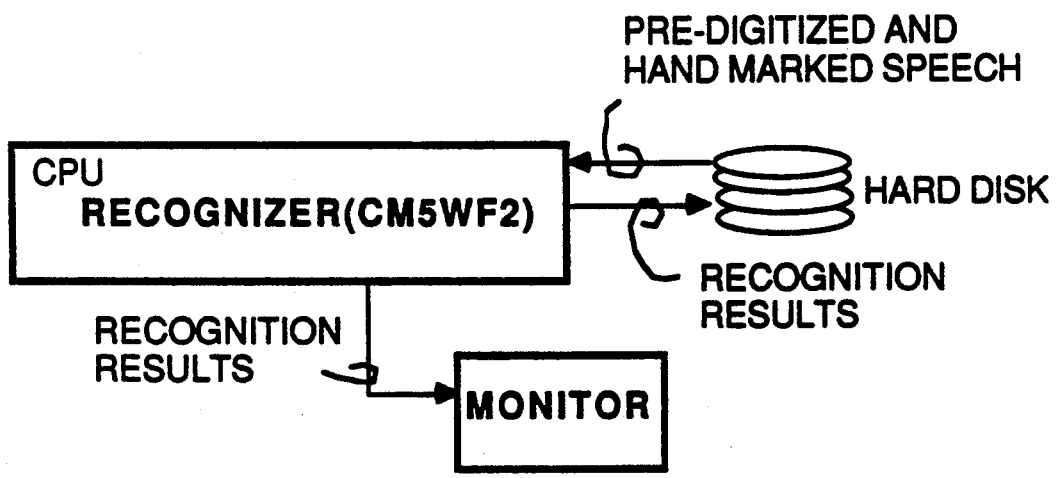
FIG. 3 is a block diagram of the CM5WF2 mode of the recognizer.

The CM5WF2 (research) version, shown in FIG. 3, was an off-line mode for batch processing previously digitized stored speech samples, which was especially useful for evaluating system performance on large databases or comparing performance of different systems. CM5WF2 provided especially detailed analysis, including printouts of SubSyllable spellings for stored speech files if desired, which made it extremely useful in diagnosing the nature of mistakes that led to recognition errors and adding words to the system's vocabulary. (As used in the present application, a SubSyllable is a cohesive segment of the acoustic signal that is generally smaller than a phoneme. A phoneme is the perceptual identity assigned to a group of speech sounds.) As described below, an iterative process for improving recognition accuracy on new words added to the vocabulary generally included several runs through CM5WF2.

Figure 4A:
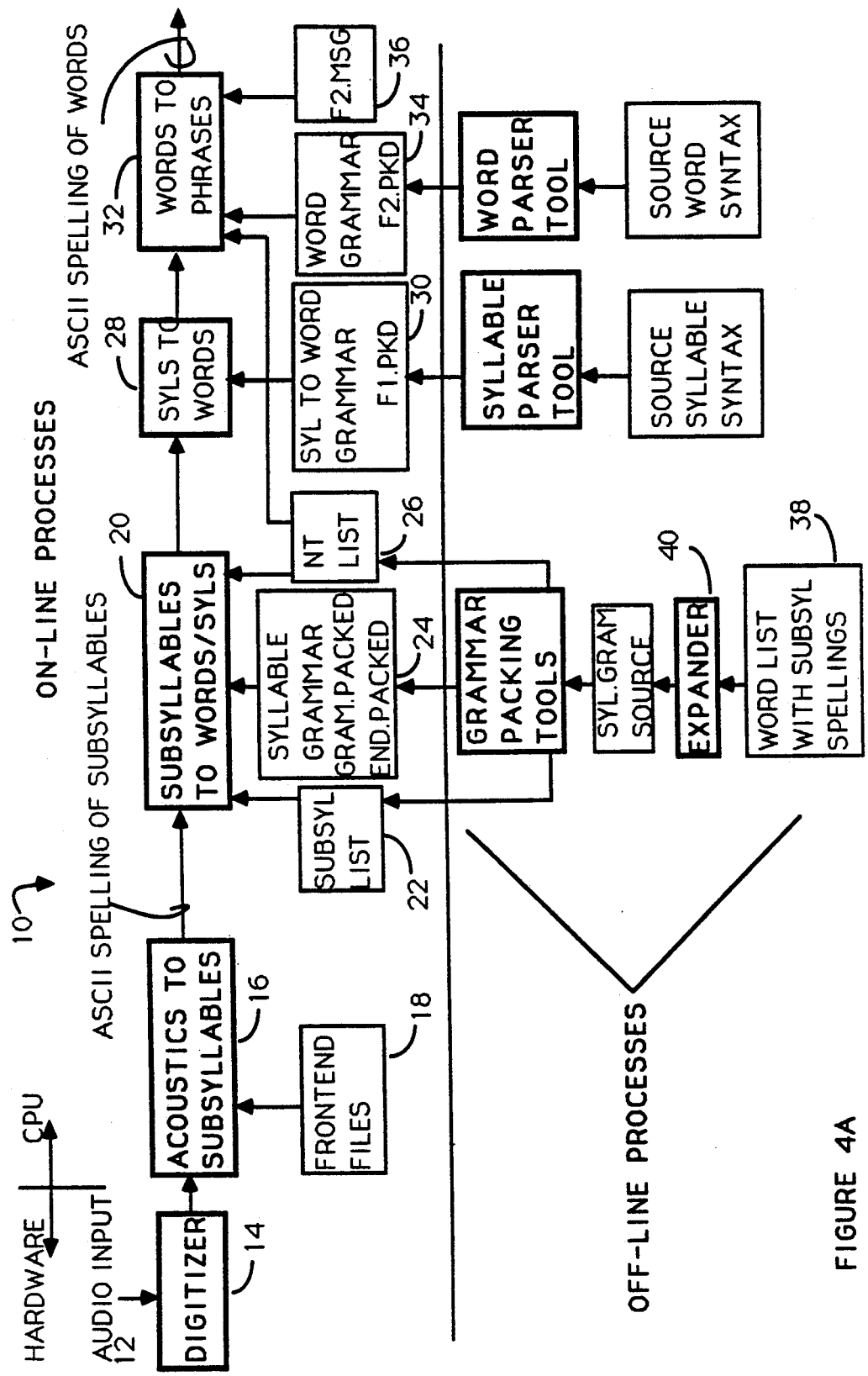
FIG. 4A is a block diagram of an automatic speech recognition system in accordance with the present invention.

It should be noted that all three configurations used identical recognition processes (structured as shown in FIG. 4A which is described below), development tools and grammatical structures, and differed only in the source of speech input and presentation of recognition results. Moreover, other configurations and sources of speech data, whether "live," recorded or otherwise, can be used in accordance with the present invention.

Acoustics to SubSyllables

Referring to FIG. 4A that shows a recognizer 10, incoming speech 12 is digitized by a digitizer 14 and passed to an Acoustics to SubSyllables module 16 wherein the digitized incoming speech data are broken into cohesive segments. The structure and operation of the digitizer 14 has been described in Applicant's U.S. Pat. No. 4,980,917 that has been incorporated by reference in the present application. As described below, each segment results in an output frame of SubSyllable symbols that characterizes major and minor phonetic attributes of the segment. The four major frame designators employed by the present recognizer are silence, frication, stable vowel, and change, although it will be understood that the present invention is not limited in language or size of vocabulary, but other selections would also be suitable. Frames are generated by the module 16, which retrieves data from a number of Front-End files 18, and appear at a variable rate, depending on the incoming speech data. In the interest of robustness, most frames preferably contain two or more SubSyllable symbols.

The digitizer hardware is conventional and was built by hand with a combination of wirewrap and soldering on a perforated-board base, although it will be appreciated that other techniques are also suitable. The final stages of the audio input to the digitizer use four op-amps in series to form respectively an anti-aliasing filter, a buffer, and a volume control amplifier. The digitizer should preferably be tested for dc bias, audio frequency response, and digital noise, since the last four op-amps can have a tendency to develop dc offsets with age. Since there was no capacitive coupling in the final stages of the audio input of Applicant's digitizer, the dc bias could be amplified by the last op-amp and result in signals with enough offset at the digitizer input to produce serious distortion (one sided clipping) of the input signals. Op-amps with internal offset compensation could be used to counter this.

Figure 5:
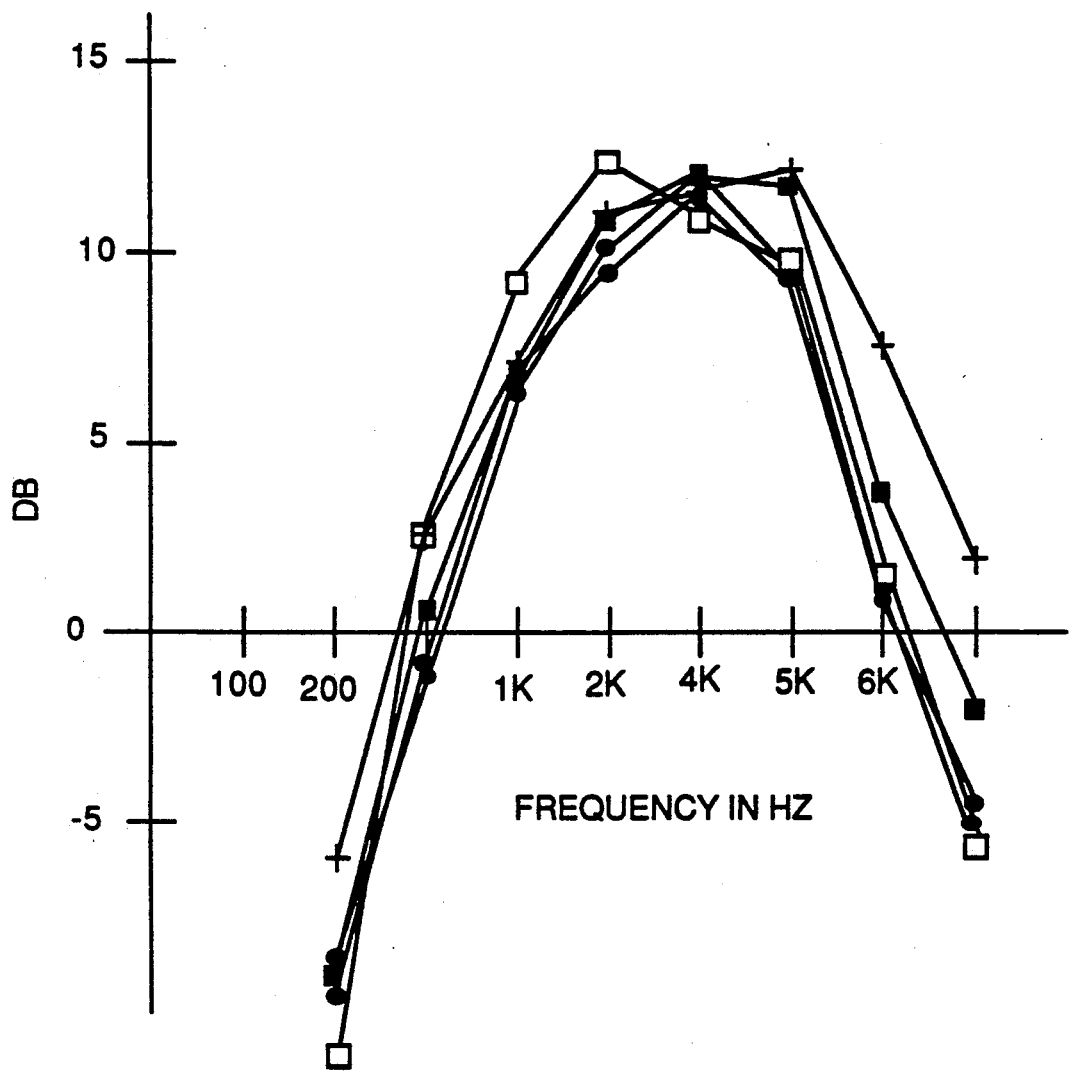
FIG. 5 shows the frequency response of several digitizers.

FIG. 5 indicates the range of frequency response measured on five such hand-built digitizers. There is noticeable variation from unit to unit even though all critical components in the audio section were specified at 1% tolerance. In some cases it appears that the combined variation in components or the random errors that occur in hand-built units were responsible for the range of measured digitizer performance.

Digitized speech data from digitizer 14 was then input in a conventional fashion to the computer, such as a MACINTOSH, and processed in accordance with the modules and other programs stored therein. The primary component of Acoustics to SubSyllables module 16 was ported from the speech processing technology described in Applicant's U.S. Pat. No. 4,980,917, modified somewhat to increase phonetic accuracy as described in more detail below. The philosophy in enhancing this module was to include only as much detail as needed to discriminate the given vocabulary, because too much detail could produce speaker dependence, decrease noise resistance, or require an inordinate number of spellings.

Module 16 of the present recognizer computes speech features in a similar way to the operation of the system described in Applicant's U.S. Pat. No. 4,980,917. That earlier patent provided for computing an arbitrary number of features, called articulatory parameters, that were then displayed, although other features and other uses were permitted. In that patent, a general process for determining parameter matrices is described, and the phoneme set given and resulting matrices are described as "exemplary".

For the present recognizer, the processes described in connection with equations 7-23 in U.S. Pat. No. 4,980,917 are used to develop the following features, which will also be understood to be exemplary: high/low; front/back; frication; nasality; and retroflexion. These terms are used herein as they are defined in any standard linguistic text book dealing with phonetics. For the present embodiment, it has been found advantageous to clamp numerical representations of each feature to the range of $+/-20$. Thus, an /s/ sound will have a high value of frication (near 20) and an /n/ or an /u/ sound will have a low value of frication (near $-20$). Of course, other ranges could also be used.

Figure 4B:
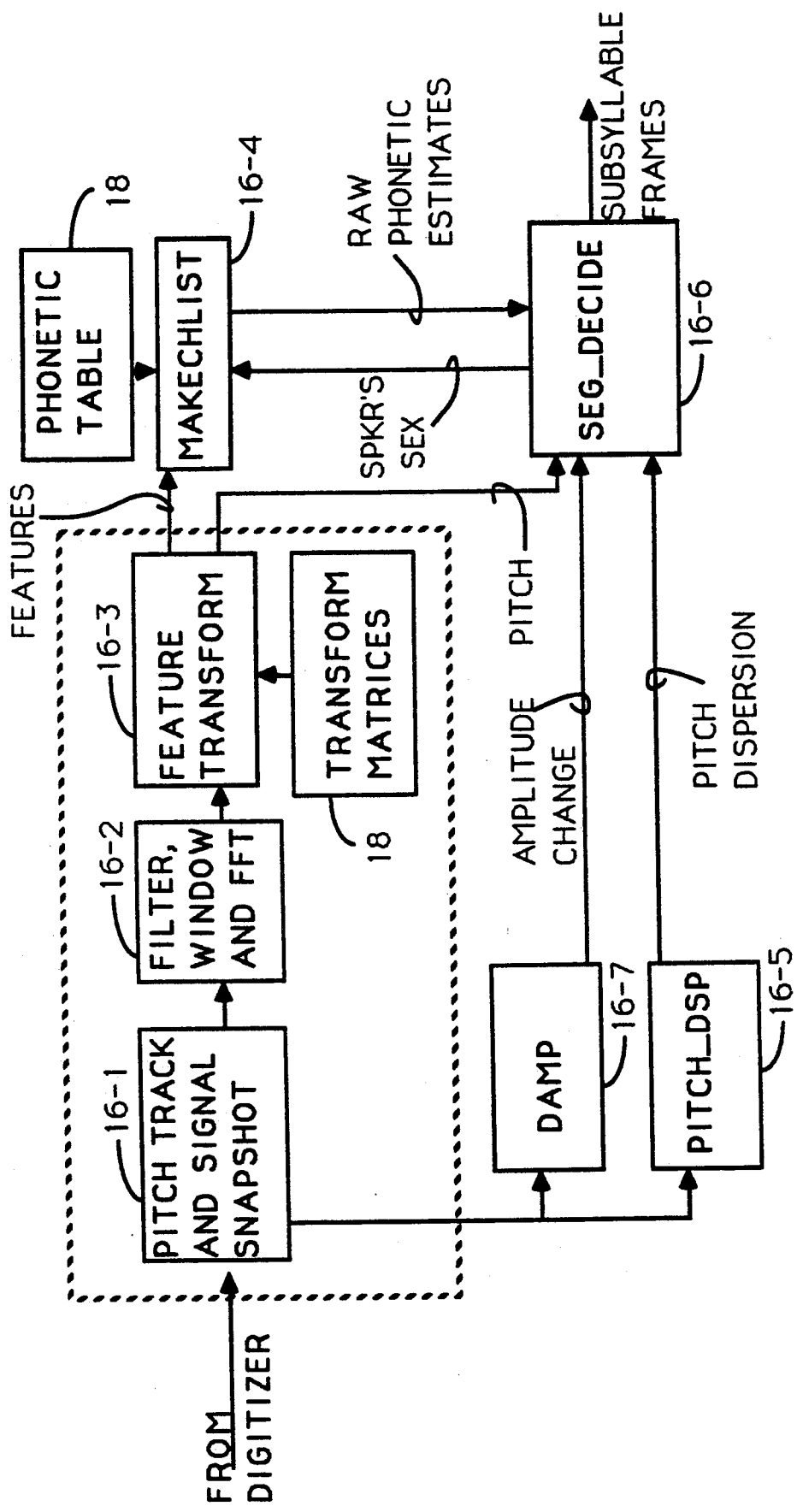
FIG. 4B is a block diagram of a portion of the automatic speech recognition system of FIG. 4A.

FIG. 4B is a block diagram of the processes carried out in Acoustics to SubSyllables module 16; the components within the dotted lines in the Figure are described in detail in U.S. Pat. No. 4,980,917. Digitized speech from the digitizer 14 is processed in module 16 by a pitch track and signal snapshot module 16-1 and a filter, window, FFT and conditioning module 16-2 that are unchanged from the corresponding modules illustrated in FIGS. 4 and 5 of the earlier patent. As described above, the feature transform module 16-3 operates substantially in the manner described in connection with FIG. 6 of the earlier patent, although preferably only five, slightly modified features are generated here. The transform matrices described in the earlier patent are shown in the present FIG. 4B as part of the FrontEnd Files 18.

A pitch value for the input speech is output from the feature transform module 16-3 and is readily determined from the time between successive window and FFT operations. (Pitch expressed as a frequency is the inverse of this time.) The pitch value is used in later modules to determine the sex of the speaker and adjust phonetic estimates accordingly. For adult males, it was found that one frame generally corresponded to one pitch period (100 Hz); for the higher pitched voices of women and children, every other pitch period could be used because the structure of the vocal tract could not usually change faster than that.

The features are passed to a makechlist module 16-4 which uses phonetic tables that are part of the FrontEnd Files 18 to prepare a list of phonetic estimates of the input speech with a weight assigned to each estimate. Attached is assembly code for a Motorola M68020 processor for makechlist, and the text of exemplary phonetic tables used in the present embodiment is shown in Appendix F. Such tables show the two-dimensional structure described below and are generated in a straightforward way by examining samples of speech.

The pitch tracking and snapshot module 16-1 passes to a pitch dispersion module 16-5 information on the distance between successive snapshots (or pitch triggers). From this information, the pitch dispersion module determines the variation (dispersion) in successive pitch intervals, which is used in a segment decision module 16-6 as part of the process to determine whether a sound is voiced (e.g., a vowel) or unvoiced (e.g., a fricative). Attached is assembly code for a Motorola M68020 processor for the pitch dispersion module used in the present embodiment.

The pitch tracking and snapshot module 16-1 also passes information about short-term signal energy to an amplitude change estimator (damp module 16-7). The damp module computes raw decisions about amplitude rise and fall in the input speech and passes that information to the segment decide module 16-6. Attached is Motorola 68020 assembly code for the damp module as used in the present embodiment.

The segment decision module 16-6 (seg_decide) uses amplitude change, pitch dispersion, and raw phonetic estimates to segment the signal into intervals of stable vocoids, changing vocoids, frication, and silence as described herein. Each segment results in one or more SubSyllable frames roughly as follows and as described elsewhere herein:

silence intervals are classified by their length;

frication is classified by length and general phonetic characteristic (i.e., /s/ versus /f/); this phonetic estimate is determined by averaging over the phonetic estimates for individual FFT frames in the segment;

changing vocoids are classified by the direction of amplitude change (rising or falling) and augmented with phonetic estimates made by averaging over the interval; and stable vocoids are broken into SubSyllable frames, each of which is 4 FFT frames long, and each output SubSyllable frame is classified by a phonetic estimate averaged over the four FFT frames. Thus, the module 16-4 and 16-6 comprise a phonetic estimator.

Module 16-6 is itself advantageously comprised of several other modules as described below.

The process of finding an average phonetic estimate over an interval of several FFT frames is performed by a module smph (smooth phonetic estimate) that also takes as input information about relative amplitude. It has been found that, for low amplitude signals, nasals and /f/ should be made more likely and that, for high amplitude signals, nasals and /f/ should be made less likely.

SubSyllable frames for stable vocoid intervals are produced by a module Vab which provides the primary and secondary phonetic estimates for vocoids based on the output of the smph module.

A module add_level is used between successive SubSyllable frames of stable vocoids to add frames describing subtle changes in amplitude. A convenient set of symbols advantageously used for the subtle amplitude contour frames are:

w—rising amplitude
l—level amplitude
v—falling amplitude

The amplitude contour frames preferably always contain an option symbol (such as @) so they can be ignored, if necessary or desired, in the SubSyllable matching process carried out by module 20.

Before each change interval that contains rising amplitude (i.e., before C^ and C^v), a frame is preferably inserted by a module AddK to provide a modifier describing the nature of the rising amplitude (one of the symbols: K k q w, whose meanings are described elsewhere herein).

During stable vocoid intervals, a module determine_sex examines the pitch and sets the variable SEX to MALE (low pitch) or FEMALE (high pitch). This variable is usually set during the first few syllable of an utterance and then remains fixed for the remainder of the utterance.

It will be understood that the phonetic symbols used in the Phonetic Tables and in SubSyllable output frames appear in FIG. 9. If a SubSyllable frame contains a phonetic entity (phoneme) that is known to be "sharable" between conjoined words in continuous speech, then that SubSyllable frame is preferably followed by a repetition of itself (or the portion that can be shared). The repeated frame begins with an option symbol of zero weight, which is to say that the repeated frame can be ignored with no penalty or used with no penalty. This repetition mechanism applies to silence, frication, and nasals (a subset of the vocoids).

It was found that as words were added to the vocabulary, the additional detail required for recognition accuracy was obtainable through statistical analyses of the parameters associated with various phonetic events. As described below, these analyses involved the application of standard signal detection theory to establish thresholds, giving optimum detection while minimizing false rejections.

Figure 6:
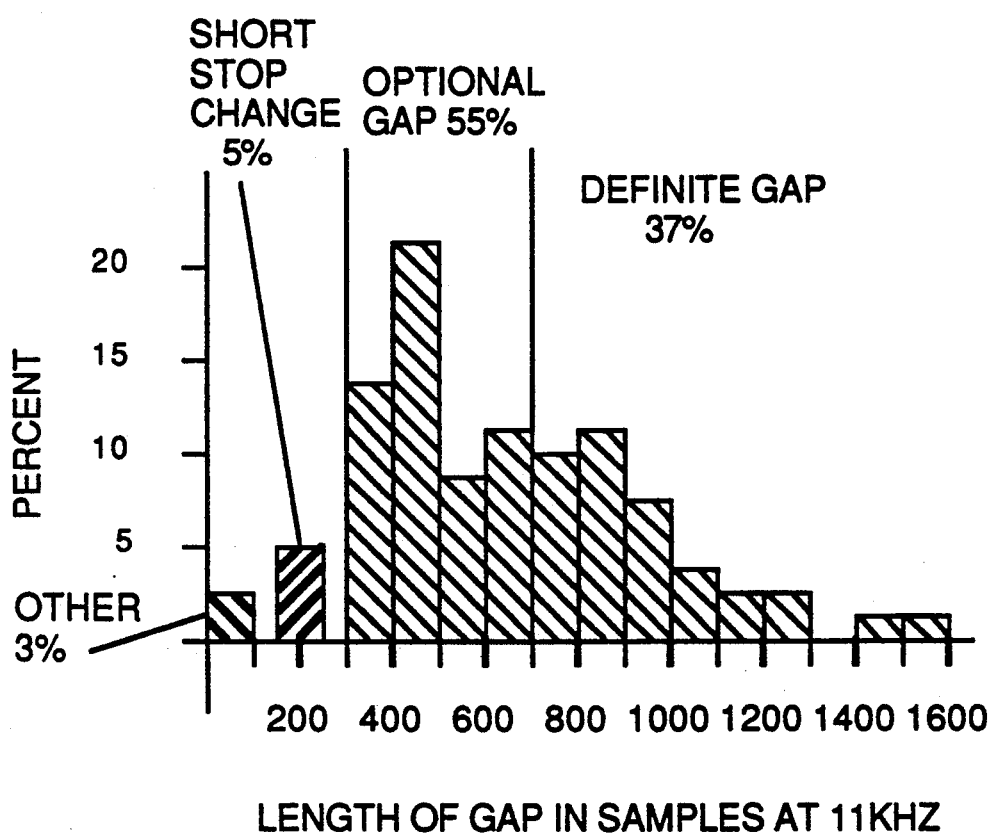
FIG. 6 is a histogram showing a statistical analysis of a phonetic element.

For example, FIG. 6 shows the result of measurements made on the length of the gap (silence, or absence of signal) associated with word medial /k/. The object of the analysis is to set thresholds that result in detecting gaps without declaring gaps elsewhere in speech where they do not occur. Measurements have shown that some speakers have a tendency to "creak" (produce abnormally low and raspy pitch) with frequencies as low as 40 Hz (25 msec period). Thus, "gaps" shorter than 300 samples of the digitizer (27 msec at 11 KHz) can be ignored without significant negative effects on the processing of speech from such speakers. Three types of gaps were declared: (1) "optional gaps" that might result from a true stop or some error in articulation (e.g., a "frog" in the throat); (2) "definite stop" gaps; and (3) "inter-word gaps" (or silence) so long as to force a word boundary.

It will be seen that since the distribution in FIG. 6 falls sharply after 1000 samples (91 msec) and no gaps greater than 1600 samples (145 msec) were observed, the inter-word boundary was safely declared at 1800 samples (164 msec). As a result of this assessment, 97% of /k/ were marked with some gap indicator and no instance of a word boundary being forced mid-word occurred. Similar empirical determinations for other phonetic elements and other classes of speakers would be carried out as just described.

Figure 7:
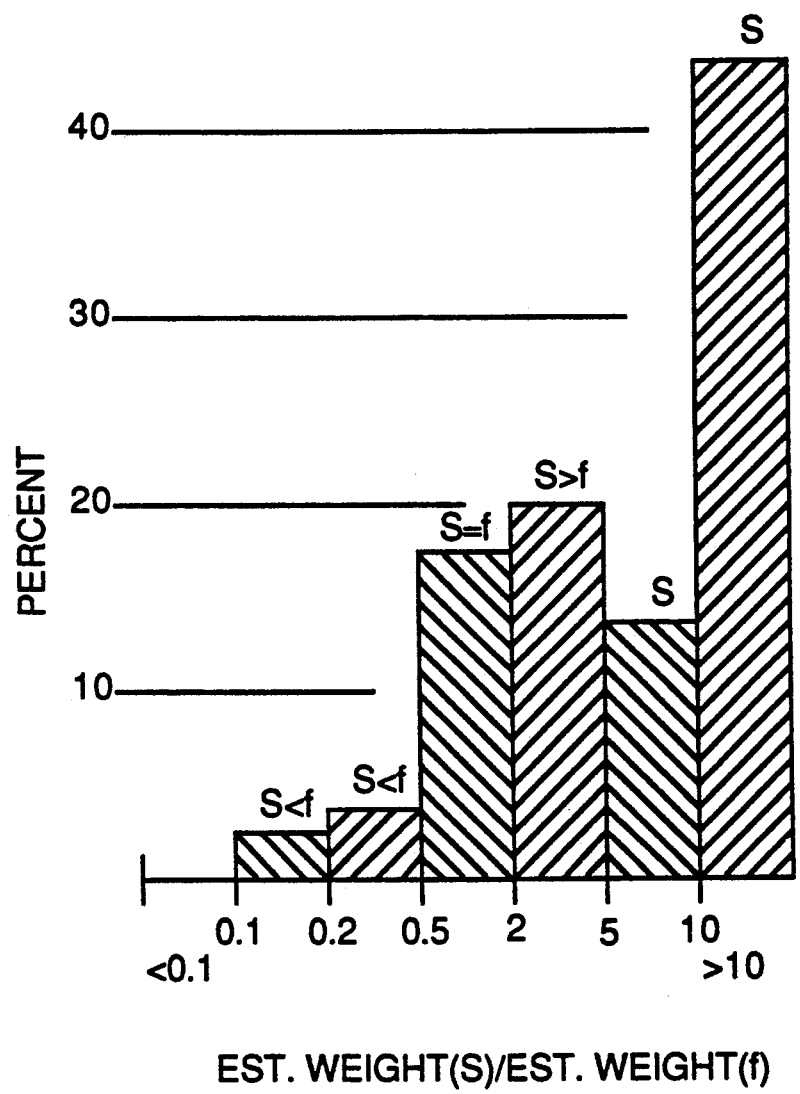
FIG. 7 is a histogram showing a statistical comparison of two phonetic elements.

FIG. 7 illustrates measurements used to optimize phonetic detection, showing the distribution of likelihood estimates when the actual phoneme is /s/. Weights were assigned by a phonetic estimator to 230 pronunciations of /s/ by ten different speakers. Since it is inevitable that some fraction of the time /f/ will be estimated as a possible phoneme when /s/ had been spoken, thresholds are preferably set such that whenever a fricative was detected the probability of a spoken /s/ being estimated as /s/ alone, or at least that /s/ would be weighted more likely than /f/, was maximized, and vice-versa for /f/.

The ratio of weights assigned was selected as being the most consistent measure. The distribution of the ratio of weights is shown in FIG. 7, along with the resulting assignments based on the threshold set. The resulting accuracy for /s/ is classified as:

| | |
|---|---|
| /s/ alone | 58% |
| /s/ more likely than /f/ | 20% |
| /s/ and /f/ equally likely | 17% |
| /s/ less likely than /f/ | 5% |
| /f/ alone | 0% |

Using these weights, in no case did the recognizer fail to detect an /s/. Only 5% of the true /s/ sounds were classified as /f/ being more likely. During 95% of the time, an /s/ in the spoken input was matched with a SubSyllable /s/ without a penalty being assessed. Weights and estimates for other phonemes are developed in a similar way.

The Acoustics to SubSyllables module 16 is described in more detail in connection with FIG. 4B.

SubSyllables to Syllables/Words

Frames output by the phonetic front-end (the digitizer 14 and Acoustics to SubSyllables module 16) are used in a SubSyllable matching process conducted in a SubSyllables to Words/Syls module 20, which evaluates all combinations of incoming options against a predetermined database 22 of SubSyllable spellings. As described below, SubSyllable symbols that were deemed phonetically less likely are used in the matching process only after attaching a penalty to any potential result. The matching process carried out by module 20 accesses a grammar process 24 and a stored table of non-terminals 26 substantially in the manner of the phrase parsing module 40-2 detailed, in Applicant's U.S. Pat. No. 4,994,996 that is incorporated by reference in the present application. Matches that produce a complete word or syllable are output to the next stage.

As just described, the module 20 was ported from the parsing technology described in Applicant's U.S. Pat. No. 4,994,996, modified somewhat, e.g., to increase processing speed. It will be appreciated that as more and more phonetic detail is added to the system, the SubSyllable spellings of each word become more complex. In a first approach to the SubSyllable to Words/Syls process, a high speed dictionary access technique, i.e., an efficient scheme for packing a list of SubSyllable spellings and searching through them, was used. As the lists grew in length, mechanisms for speeding the list search by a factor of four to ten were added, but it soon became clear that the size of the lists would grow exponentially to accommodate the required phonetic detail.

Execution time depends geometrically on the average number of SubSyllables per frame and the average number of options available at each point in the SubSyllable spellings. The magnitude of the effects of this relationship would not be felt until high accuracy on a wide range of speakers for a number of similar words is desired.

As a simplified example of this growth, consider an initial, crude phonemic spelling of SQUAWK as /skO/; this requires a single rule for processing SQUAWK. Adding phonetic detail to account for vowels of varying length, mispronunciations of /sk/ as /s/, and dialect variations such as /skuak/, /sk&wOk/, etc. could result in:

$$\left\{ {sk \atop s} \right\} \left( \left\{ {u \atop \&} \right\} \right) \left\{ {a \atop O} \right\} \left( \left\{ {a \atop O} \right\} \right) \left( \left\{ {a \atop O} \right\} \right)_k$$

or 36 individual spellings, if written out as a dictionary-style list. In fact, it normally requires a sequence of SubSyllable options to specify the equivalent of a single phoneme and the effects of the multiplicative factor are even more pronounced than in the above example.

Figure 8A:
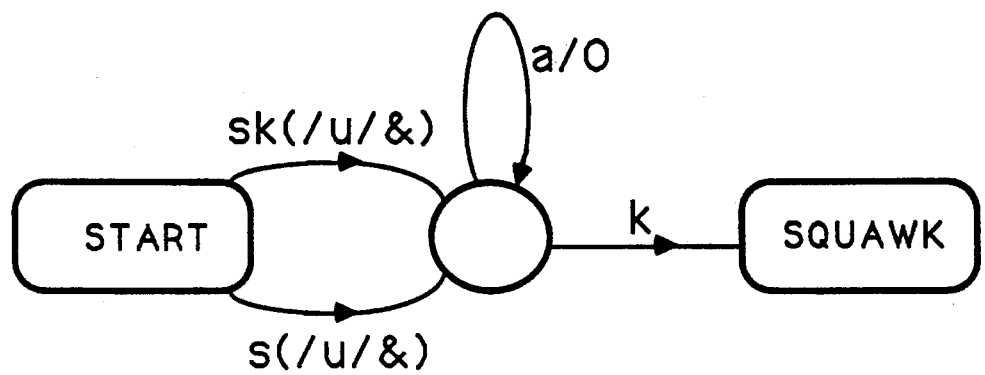
FIGS. 8A and 8B show networks for processing SQUAWK and SIX, respectively.

To constrain this geometric growth, minimizing the amount of phonetic detail in the SubSyllable spellings would have an effect on accuracy that was typically not acceptable. In accordance with the invention, a combination of dictionary spellings with network structures has been selected. The result for SQUAWK as spelled above phonemically is the network shown in FIG. 8A and the result for SIX as spelled above phonemically is the network shown in FIG. 8B.

Such structures are described with respect to phrase parsing in U.S. Pat. No. 4,994,996 and are referred to as SubSyllable to syllable grammar in the present application. The processes used for speech recognition generally are those employed in the phrase parsing module 40-2 of the earlier patent with two kinds of modifications:

1. changes to conceptually support speech recognition —primarily the inclusion of a weight on each path that records the cummulative weight associated with using secondary vocoid phonetic estimates, option symbols of verious weights, etc. (this weight is the variable wt in the path structure); and 2. changes related to efficiency of processing—these include: (a) alternating between two copies of the path log rather than writing results back into a single log (this approach uses more memory space but saves much time by not having to search for the best place to write in a single log when a path has been processed and must be copied back to the log); and (b) restructuring the log so that multiple subpaths describing different states in syllable-to-word and word grammars are associated with a single position in the phrase parsing (multiple possible previous non-terminal outputs are carried along with a single description of the current state of SubSyllable to syllable look-up). The latter ensures that each action in the SubSyllable to syllable look-up is executed the minimum number of times.

In this way, at any point in time only one path will be "out of SubSyllable look-up," i.e., between words not mid-syllable. At the conclusion of an utterance, the subpaths associated with the path that is not mid-syllable are examined. The subpath with the lowest weight is selected as the recognizer output (string of nonterminals=words).

The magnitude of the effect of this change is best summarized by the following statistics. A SubSyllable source spelling of SQUAWK requires 9 lines of text, each ranging in length from 3 to 14 symbols, and the network for SQUAWK can be packed into 1140 bytes. Using the original scheme, the same amount of phonetic detail would require 37,580 lines of text in the source file and would pack to a table requiring 132,000 bytes. Thus, more than a 100-fold reduction in memory for the on-line system and a 4,000-fold reduction in the amount of text to be entered and maintained in the source files is provided by the selected dictionary spellings with network structures approach.

Syllables to Words

A syllable-to-word mapping process carried out in a Syls to Words module 28 advantageously combines two or more syllables normally spoken distinctly into a single word. For example, the preceding stages could recognize FOUR and -TEEN as separate syllables that would be combined to form FOURTEEN. The module 28 accesses a syllable-to-word grammar process 30 substantially in the manner of the phrase combining module 40-3 described is U.S. Pat. No. 4,994,996. For the present recognizer, a single pass (rather than two passes) through a phrase-combining-like process was used; thus, the second pass phrase combining variables and steps 408 and 410 of FIG. 6a of that patent were not used in module 28 of the recognizer. This stage reduces the total number of rules in SubSyllable spellings and thus increases processing speed.

Word Grammar (Words to Phrases)

Sequences of words from module 28 are then preferably checked for grammatical acceptability, i.e., for conformance to a predetermined set of sequence rules, by a Words to Phrases module 32 that uses a word grammar module 34 and preferably outputs ASCII spellings of the recognized words in the incoming speech 12, although other outputs could be suitable depending on the uses to which they would be put. The Words to Phrases processing in the recognizer is substantially similar to the operation of the sentence checking module 40-4 described in U.S. Pat. No. 4,994,996. The operations shown and described in connection with FIG. 7a of that earlier patent were used without modification for the present recognizer; the operations connected with FIGS. 7b and 7c are not used in the present recognizer, but any could be in suitable instances.

The actions described in FIG. 7c of the earlier patent were directed to subject-verb agreement in strings with nested structures. In some situations, e.g., the present aircraft cockpit embodiment, no actions are necessary. For other situations, actions could be related to other verifications of string integrity or validity, such as check-sums for verifying credit card or other identification numbers, to simplifications of spoken numbers (e.g., "three thousand four" would result in 3004, but "three thousand four hundred" would result in 3400), or to other actions depending on the desired recognition application.

As described below and in the above-cited U.S. patent, a word sequence deviating from the predetermined set of sequence rules is assigned penalty weights so that it will be less preferred than a sequence conforming to the rules. Thus, in the aircraft cockpit embodiment, SQUAWK SEVEN SEVEN ZERO ZERO <exhale> might be recognized as SQUAWK 7700 and SQUAWK 77001, but the latter would be rejected because the grammar of the aircraft 10 embodiment restricted valid SQUAWK sequences to values 0000–7777. The module 32 also accesses a stored table of messages 36 in the manner described in the earlier U.S. patent and operates substantially as described therein.

The data reduction provided by the embodiment of the overall system shown in FIG. 4A presents some interesting statistics. Digitized speech enters module 16 at 11K bytes per second. During continuous speech, ASCII spellings of the words would need to be output from module 32 at a rate of about 8 bytes per second to keep up with the input, making for a rate reduction from the input of a factor of about 1400. This reduction is accomplished by the present embodiment in two primary steps: (1) reduction from digitized audio to SubSyllables, which typically appear at a rate of 160 bytes per second; and (2) reduction from SubSyllables to output ASCII spellings of words primarily via the SubSyllable to syllable stage (module 20). In the aircraft cockpit embodiment, the first stage consumed only 20% of the processing time to provide its 70-fold reduction, while the second stage consumed almost 80% of the time to provide the remaining 20-fold reduction. The final two stages (syllable combining in module 28 and word grammar in module 32) together took less than 1% of the processing time.

Support Tools

Various off-line support tools may optionally be provided for development of alternate vocabularies and grammars to handle other applications as illustrated in FIG. 4A. The tools would include support for SubSyllable packing 38, syllable-to-word packing 40, and word grammar packing 42. In addition, a word marking program may be provided to aid in detailed analysis of utterances and preparation of databases for performance analysis.

The theory of recognizer operation, including hardware and software capabilities and features specific to the aircraft cockpit embodiment is further described below; the installation of an embodiment of the recognizer on a MACINTOSH IIx computer, and detailed operational instructions are also described. Step-by-step instructions for expanding the current vocabulary are also described.

1.1 Hardware Capabilities

The present embodiment can be implemented with the following CPUs: MACINTOSH IIcx; MACINTOSH IIci; MACINTOSH IIx; MACINTOSH IIxi; MACINTOSH SE/30; or equivalent, and with the speech digitizer and cable, a standard microphone and cable, and an RS-232 cable for SIMSYST operation.

The installation instructions given below assume a hard drive is used; this is a preferred configuration.

While all modes currently run on a MACINTOSH SE/30, some detailed SubSyllable information in DEMO and SIMSYST would not appear on the SE/30's smaller screen. It will be appreciated that these installation instructions may be adapted to other processors and thus are not to be considered restrictive of the present invention.

1.2 Software

The present embodiment uses the MACINTOSH System/Tools Version 6.0.3 or above (but not System 7.0), and runs under FINDER, but not MULTIFINDER. A Control Panel (described further below) should be set for a minimum RAM cache (32K) or the RAM cache should be turned off. For further settings, see the Installation Instructions below. The present embodiment's ASR programs run under the Aztec C-Shell, which is referred to hereinafter as the "C-Shell," and it can be noted that operation on a MACINTOSH IIci computer requires version 3.6d or later of the C-Shell.

1.3 Theory of Operation

As noted above, the present system uses a psycholinguistic approach to recognition, roughly modeling the process by which a human being listens. A block diagram of the overall system 10, shown in FIG. 4A, comprises four elements or steps. The output of each step becomes the input to the next one.
1. Acoustics to SubSyllables
2. SubSyllables to SubWords
3. SubWords to Words
4. Words to Phrases

1.3.1 Acoustics to SubSyllables

Rather than attempting to determine whether speech sample X matches template Y, the present system uses information about the type of sound in a given segment. For example, the sounds /s/ and /sh/ generate slightly different spectrograms, but are both classified as fricatives sounding like /s/. The present recognizer is satisfied with knowing that segment X is a fricative; its exact identity is not crucial.

When speech 12 is entered into the system 10, for example from a saved, digitized speech sample on a disk or directly from the digitizer 14, a series of modules analyze the digital signal for acoustic attributes. Based on these changing attributes, the first stage 16 of the recognizer 10 divides the speech into cohesive segments, which generally correspond to temporally stable configurations of the vocal tract and to the transition interval between such stable configurations. Thus, the results of this analysis place each segment of speech into one of four categories of gross approximation:
1. Silence
2. Fricative
3. Vowel
4. Change interval These four gross categories are further distinguished by the duration of silence, the strength or weakness of a fricative, the articulatory quality of a vowel, or the rising or falling amplitude of a change interval. Once a segment has been analyzed to this finer level of detail, a symbol or set of symbols, reflecting both gross and fine qualities, is assigned to the segment. An individual symbol or set of symbols constitutes the "spelling" of a SubSyllable. To ensure robustness of the overall system, primary (most likely) and secondary (next most likely) SubSyllable spellings are generated as described below. The resulting set of SubSyllable spellings is called a Frame. Frames are distinguished from one another by the mark ")".

A convenient set of symbols that is associated with the gross categories are:
1. # silence
2. F fricative
3. V stable vowel
4. C change interval A fine distinction advantageously applied to frication is /s/ to indicate a strong fricative; weak fricatives (i.e., "f" and "th" in American English) are represented by "F" alone. The symbols "i, I, e, E, A, a, o, u, &, r, R, and n" are used to further quantify stable vowels, e.g., "Vi" is a stable vowel, as in THREE. Such symbology is generally conventional in linguistics, and an advantageous set of phonemic symbols is shown in FIG. 9.

The symbols "^" and "v" are used to modify change intervals. Change intervals may also have a phonetic modifier, e.g., "C^r" is the spelling for "amplitude rising, sounds like /r/."

A SubSyllable is preferably marked as secondary by inserting "z" after the first character. Thus, the frame "Va Vz&)" indicates that /a/ is the primary choice and that /&/ ("uh") is the secondary choice. Detailed tables describing the generation of SubSyllables are discussed below.

In determining the most likely and next most likely phonetic estimates, a set of tables that relate estimates to the sounds which generate them is accessed by a phonetic estimator as described above. Each cohesive speech segment datum is located in its corresponding table and the phonetic estimates at that location and a small number of neighboring locations are examined. The most likely estimate may thus be determined as the most frequent estimate in the locations examined. Similarly, the next most likely estimate is determined as the next most frequent estimate in the table locations examined.

1.3.2 SubSyllables to SubWords

Once SubSyllables have been assigned to a sequence of speech segments, the string of SubSyllables is compared (module 20) to the SubSyllable Grammar 24, which contains tables of predetermined "spellings" of words or parts of words. These tables may be compressed to limit the memory requirements, e.g., by off-line application of table packing tools, but compression is not required. If a sequence of SubSyllable spellings from successive frames matches a spelling in the table, recognition is achieved. During this comparison, penalty points are assessed to analyzed sequences that use a secondary SubSyllable to generate a match. For example, suppose the analyzed sequence is:

$$\left. \begin{array}{c} F \\ Fzs \end{array} \right\} C^\wedge \ Vr \ Vo$$

and the spelling in the table is:

$$Fs \ C^\wedge \ Vr \ Vo$$

The two will be called a match; however, the analyzed sequence will be assessed a penalty because the fricative in the table-derived spelling (Fs) matches only the secondary (Fzs) spelling from the acoustic stage. The present ASR system keeps track of all analyzed sequences and their assessed penalties throughout the process. At the end, the sequence with the least number of penalties is considered the recognized result.

1.3.3 SubWords to Words

For some vocabulary items, it is better to break the word into constituent parts (SubWords) than to try matching long, analyzed sequences to long spellings. This has two benefits. First, it saves space in the system, which means it can work faster. Second, it reduces the potential of making mistakes while entering the spellings into the Grammar.

For example, the terms UHF and VHF were both words in the vocabulary of the aircraft cockpit embodiment. These terms are advantageously represented in the Grammar with spellings for U-, V-, and -HF, thereby avoiding a need for two sets of spellings for -HF in the Grammar. In the SubWord to Word stage 22, two analyzed sequences (identified as U- followed immediately by -HF) are combined to form the complete term UHF. This approach may also be used to produce, for example, SIXTEEN from SIX- and -TEEN, as well as other suitable terms as determined by the language and vocabulary used.

1.3.4 Words to Phrases

Finally, the identified words are combined into acceptable phrases by the module 32. In the aircraft communication embodiment, a phrase must begin with a command, and each command has a set of possible words that may follow it. For example, the command SQUAWK must be followed by four digits, each of which has the value of SEVEN or less. Similarly, if the first word of a string is identified as a digit, that string will be dropped from the possible responses for not complying with the Word Grammar 34. The Word Grammar 34 of the aircraft cockpit embodiment is shown in FIG. 10A and grammars for other vocabularies would be similarly developed. Such grammars are extensively discussed in Applicant's U.S. Pat. No. 4,994,990.

1.3.5 Final Recognition

As a sequence passes through the processes, it generally matches several different SubSyllable spellings. The final reported recognition is based on a comparison of the penalty points assessed to each of the possible spellings, as well as a consideration of any grammatical errors that may have been detected by the Words to Phrases module 32. Of all the sequences with the minimum number of grammatical errors, the sequence with the least number of penalty points from SubSyllable matching at the end of the process is reported as the recognition result.

1.4 About The Aircraft Cockpit Embodiment

The embodiment for the aircraft cockpit contained SubSyllable spellings for the words shown in FIG. 10B and the grammar was that shown in FIG. 10A. In the research mode (CM5WF2, described below), the grammar also advantageously accepted the digits 8 and 9 in IFF/SQUAWK commands.

The front-end files 18 (for acoustic processing) would preferably be tailored to a standard microphone. It will be understood that the front-end files include stored representations of digitized speech that are accessed by the Acoustics to Subsyllables Module 16. The module 16 includes suitable features disclosed, in Applicant's U.S. Pat. No. 4,980,917 for Method and Apparatus for Determining Articulatory Parameters From Speech Data, which has been incorporated by reference. Testing with a flight mask revealed no need for changes, so the same front-end could be used with an unpressurized oxygen mask.

Installing the recognizer programs was designed as a simple process of copying folders onto a hard drive. Each of the folders mentioned below in Section 2.2 contained all the files necessary to run that particular mode of the system; installing the folders as described automatically installed the complete system. Only the Shell and Edit programs were required to operate the programs, although Apple's MACWRITE program could be used to process the output of CM5WF2. Edit was part of the Aztec C package.

2.1 Aztec C-Shell

The recognizer programs run under the Aztec C-Shell; the standard Aztec Development Package was used to install the Aztec C system on a hard drive. The result was:
 1. A C-Shell icon in the folder hd:System Folder
 2. A new folder called hd: Aztec containing the C utilities.

It will be noted that installing the C-Shell on a MACINTOSH IIci computer requires Version 3.6d (2/5/90) or later of the Shell; earlier versions will not operate on a IIci with less than 8 Mbytes of RAM.

2.2 Recognizer Folders

A SIMSYST disk for implementing the SIMSYST recognizer mode contained one folder called Sim that was copied onto the hard drive in the Aztec folder. The DEMO disk contained two folders, Demo and Gram.src that were both copied into the Aztec folder on the hard drive. The SUPPORT TOOLS disk contained folders called F1 and F2 that were copied into the Aztec folder also. Finally, using the File menu under Finder, a new folder would be created in the Aztec folder, and named Cspc. (The Cspc directory was a folder in which saved speech samples would be kept.) These were all the folders needed for operating the recognizer in a MACINTOSH environment.

The listing for the Aztec folder typically looked like this:
 hd:aztec/
 Sim (directory)
 Demo (directory)
 Cspc (directory)
 Gram.src
 F1
 F2
 other Aztec directories (bin, include, etc.)

How to use SIMSYST, DEMO, CM5WF2 and the SUPPORT TOOLS is described below in sections 3.x.

2.3 Hardware Setup

Figure 11:
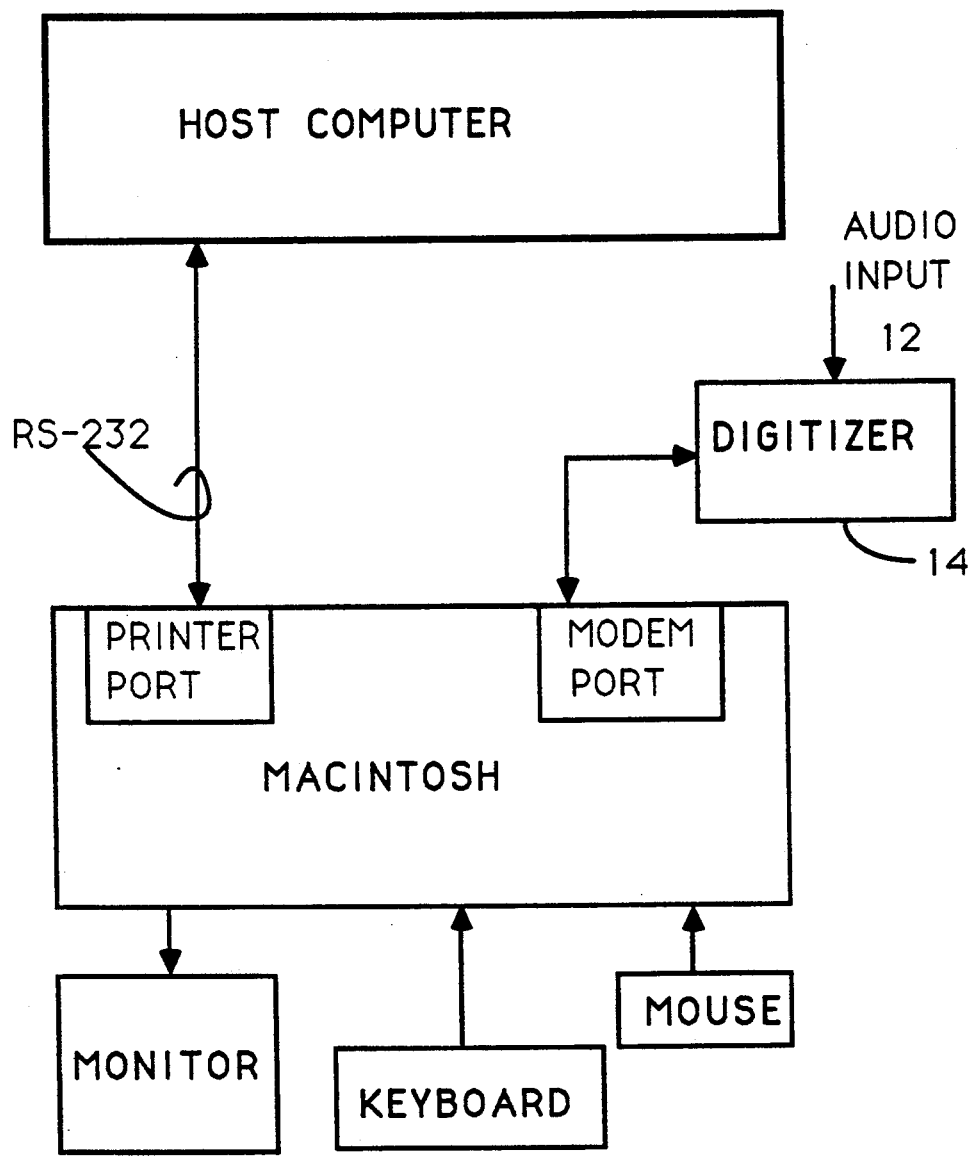
FIG. 11 shows a recognizer hardware configuration.

Setting up the hardware in the correct manner made for smooth operation of the recognizer. The hardware was hooked up to the MACINTOSH computer system as shown in FIG. 11.

Figure 12A:
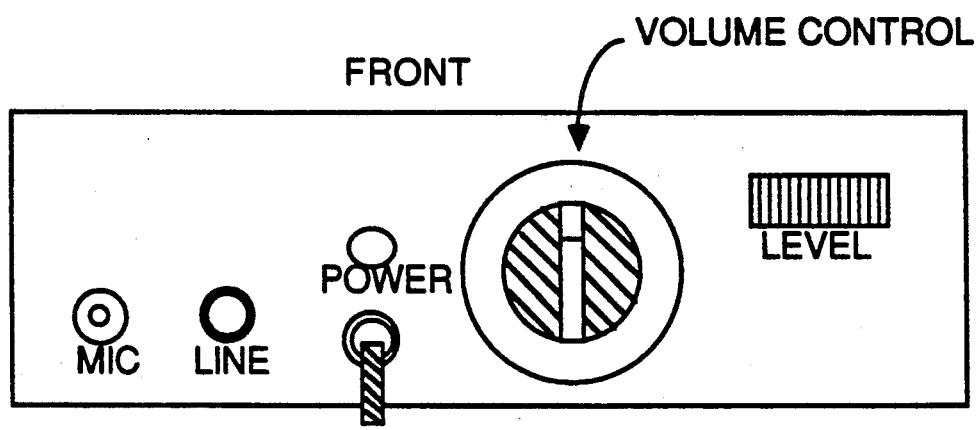
FIGS. 12A and 12B show front and back panels, respectively, of a suitable digitizer.
Figure 12B:
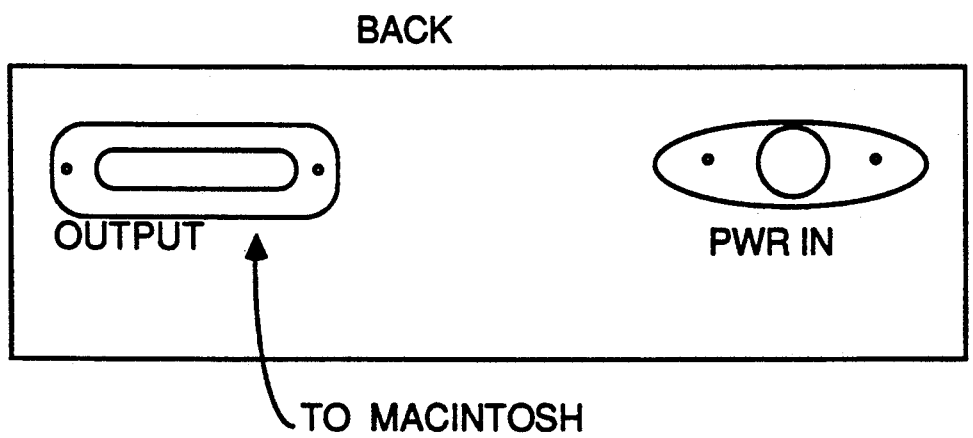
Figure 12C:
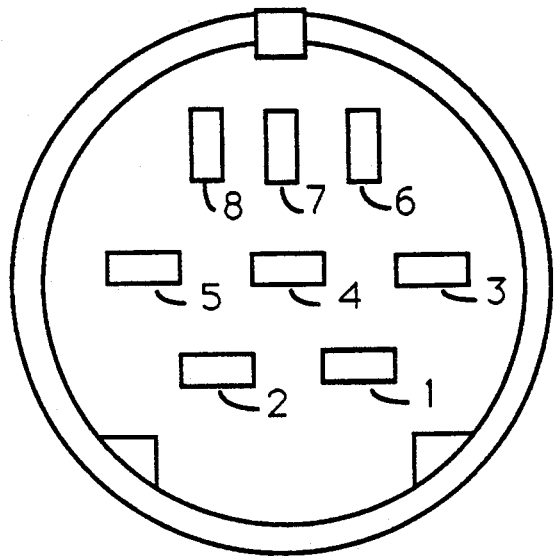
FIG. 12C shows connections to a serial printer port on a MACINTOSH computer.

Referring to FIGS. 12A and 12C, the digitizer had two inputs on the front panel. One, labeled MIC, was for a microphone, and the other, labeled LINE was for audiotaped speech input. The volume control would be set so that input speech peaks would occasionally drive a level indicator into a red range from a green range. The digitizer had two connectors on the back panel labeled PWR IN and OUTPUT. The digitizer was conveniently powered through the PWR IN hookup by an Elpac power unit (transformer) plugged into any standard outlet. A suitable cable was connected from a DB-9 OUTPUT jack on the digitizer 14 to the mini-8 modem port of the MACINTOSH computer. The printer port (RS-232), shown in rear view in FIG. 12C, on the MACINTOSH was connected to the simulator control computer when using SIMSYST.

2.4 System Software Setup

The present system was configured for the Apple MACINTOSH computer interface and operating system, FINDER, which are described in documentation available from Apple Computer Corp. The options usually set on the Mac Control Panel (a menu item under the apple in the upper left corner of the screen) were:

Speaker Volume—7 (max);
Monitors—Black and White; and
Ram Cache—32K or off.

As indicated above, each of the three modes of operation had different inputs and outputs. The modes DEMO and SIMSYST used the digitizer interface and were designed for real-time operation, while the CM5WF2 mode was designed for off-line research.

DEMO processed only individual phrases, but its input could come directly from the digitizer or from a saved speech sample in the Cspc folder. In the DEMO mode, the recognizer was activated by clicking on the RECORD button on the DEMO screen.

SIMSYST, like DEMO, processed only individual phrases, but unlike DEMO, SIMSYST operated in conjunction with a host computer that gave the command to begin or end recording and that received the recognition results.

CM5WF2 was used to increase the accuracy of the existing vocabulary or to increase the vocabulary itself. It was designed to process a list of individual speech files from the Cspc folder as one large batch, and record the SubSyllable spellings and recognition responses in an Edit document for later review.

The operation of each mode is described in more detail below.

3.1 Common Menu Options

Figure 13A:
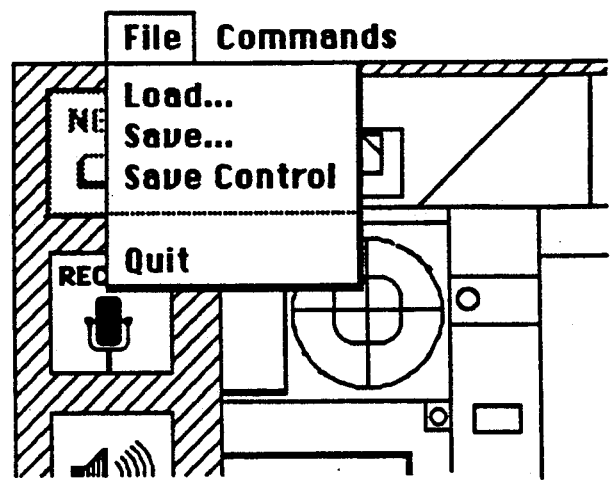
FIGS. 13A, 13B, 13C and 13D illustrate menus accessed in the SIMSYST and DEMO modes.
Figure 13B:
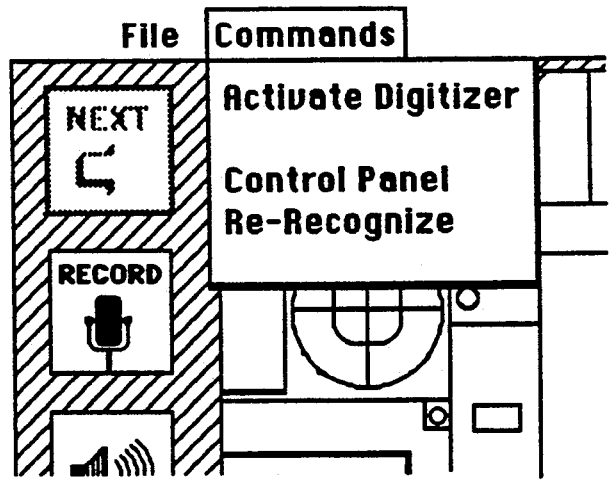

SIMSYST and DEMO accessed two common menus, File and Command, as shown in FIGS. 13A and 13B. (CM5WF2 did not have a comparable interface or the options discussed below.) The standard MACINTOSH Desk Accessories software, such as the Calculator or Chooser programs, were not used during DEMO or SIMSYST operation.

3.1.1 File Menu.

The File menu shown in FIG. 13A allowed the operator to save a speech sample onto a disk, to load a previously digitized speech sample into the system, to save a control panel, or to quit the system. The Save option saved a speech file from RAM to the hard drive. When this option was selected, a normal MACINTOSH Save File box appeared on the display. Any MACINTOSH-acceptable file name could be used for saved files, but it was convenient if all speech file names ended with .cspc and were saved in the Cspc folder. The .cspc identified the file as a speech file and was used by CM5WF2 and Mrk.Wsyl. This function was active in the DEMO mode only.

The Load option allowed a previously saved .cspc file to be loaded into the system, and loading a file erased any previous speech from the system. Thus, if the digitizer had been used immediately prior to loading a saved file, the digitized sample in memory would have to be saved as a .cspc file before loading a new file to avoid loss. To avoid inadvertently loading non-speech files, it was arranged that only speech files that were saved with the DEMO program could be loaded, and only the DEMO mode allowed file loading.

The Save Control option saved the current control panel settings (see below) as a file called "control.file."

3.1.2 Command Menu.

The Command menu shown in FIG. 13B allowed the operator to activate the digitizer, to see and modify the control panel, and to reprocess the current speech sample.

If the digitizer was automatically activated when the system was first brought up, the message "digitizer activated!" would appear. If a dialogue box appeared instead, saying that no digitizer was connected, the digitizer would be checked to make sure it was turned on, and that all connections were correct. Once properly connected, the Activate Digitizer option would be selected from the Command menu and the "digitizer activated!" statement would appear. The digitizer was reactivated each time it was turned off and on.

Figure 13C:
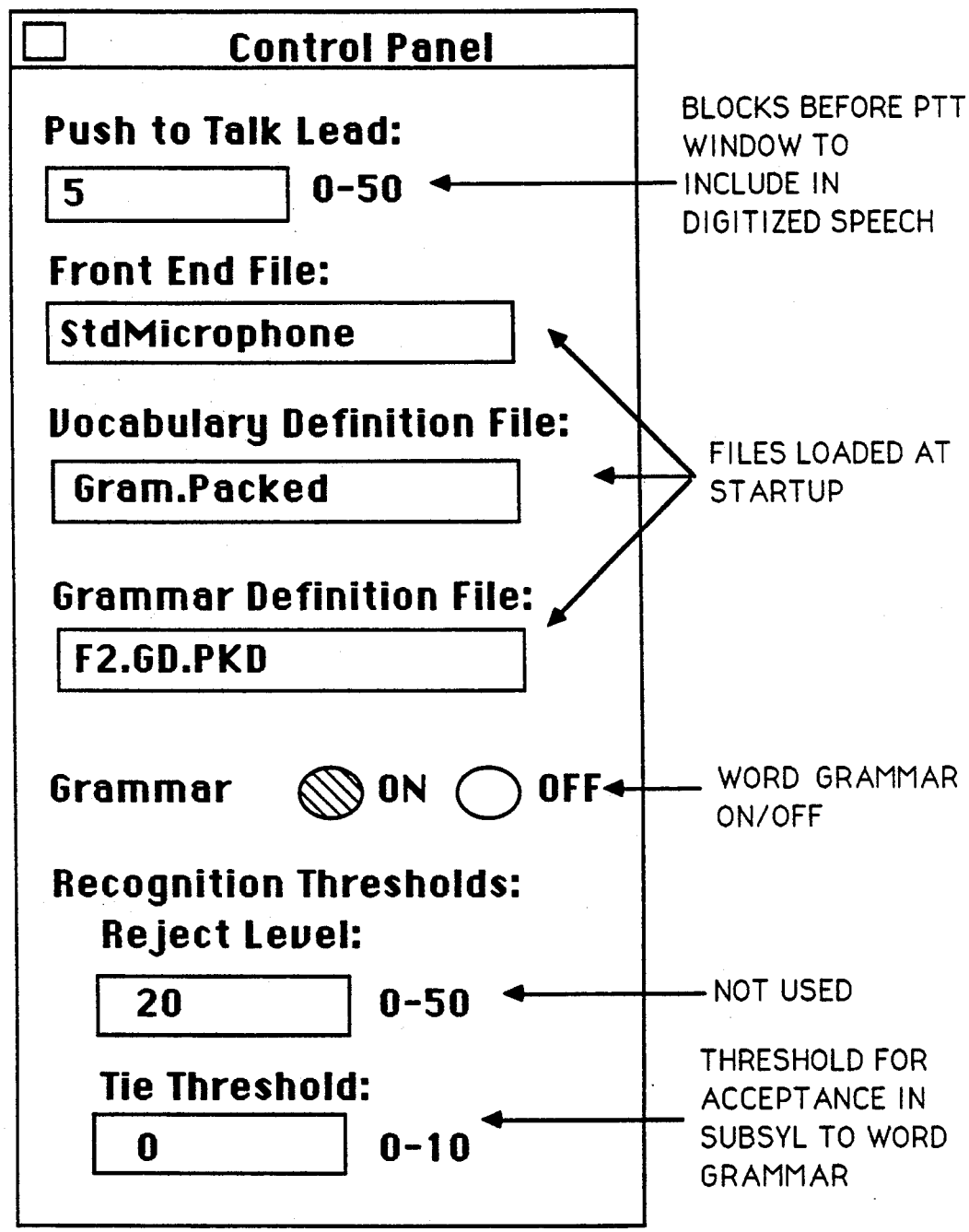

Referring to FIG. 13C, the Control Panel function allowed the operator to modify various parameters such as Grammar, Noise Thresholds, Push-to-Talk Lead, and the Tie Threshold. The parameters, ranges and values selected are shown in FIG. 13C. On the DEMO control panel, only the Tie Threshold number would be selectable. It was normally set to zero, meaning that only SubSyllable sequences having scores equal to the best sequence would be reported. On the SIMSYST Control Panel, both the Push-to-Talk Lead and the Tie Threshold could be changed.

3.2 SIMSYST

SIMSYST allowed a pilot in a flight simulator to use the recognizer as he would if he were in a real cockpit. In the SIMSYST mode, the recognizer was connected to the simulator computer (the host), and controlled by commands given by the host. The connectivity used is shown in FIG. 1.

Figure 14:
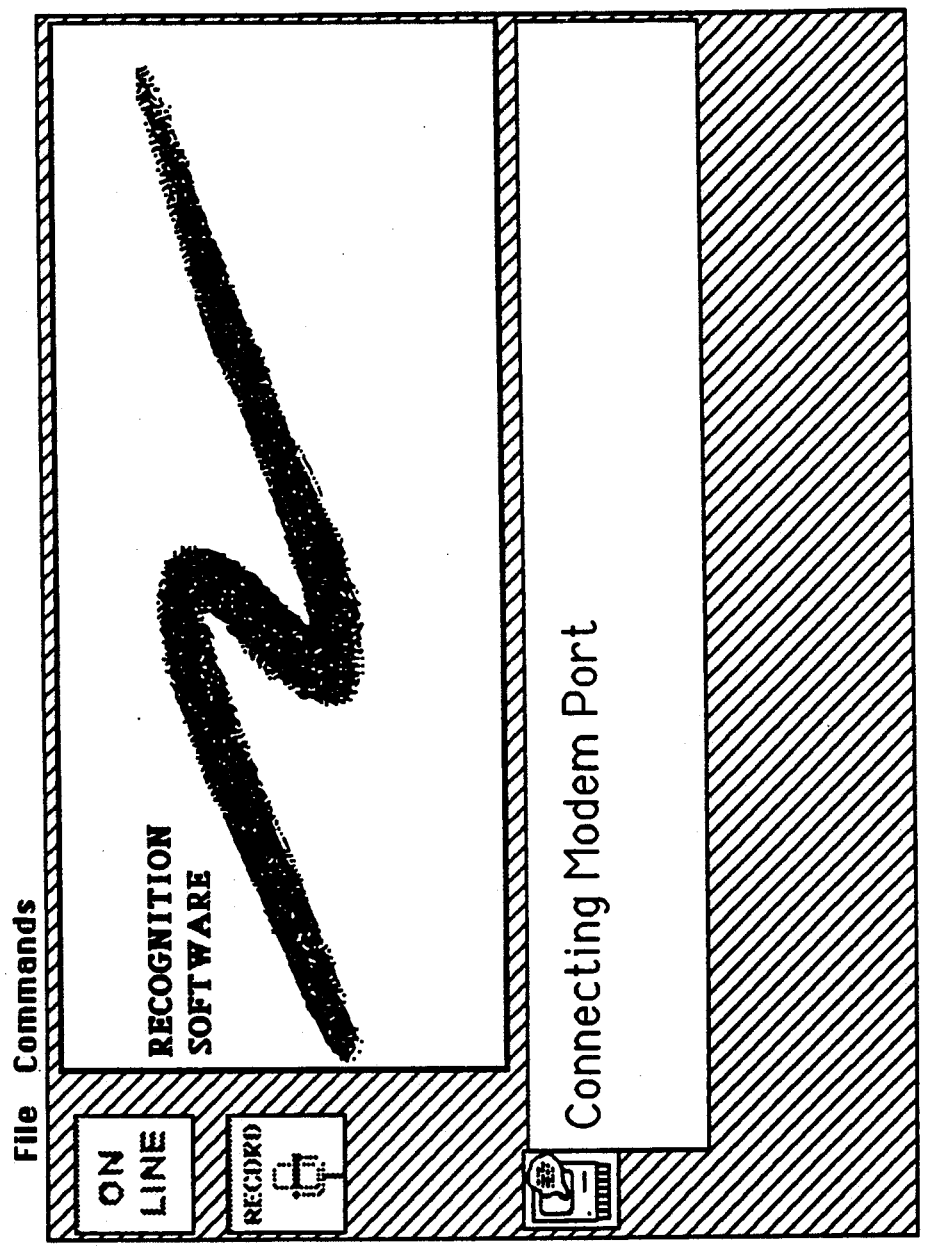
FIG. 14 shows a computer screen display used with the SIMSYST mode.

To access SIMSYST, one double clicked the mouse on the Shell icon. Once in the Shell, the current directory was set to the SIMSYST folder by typing: cd hd:aztec/simsys, followed by RETURN, then SIMSYST followed by another RETURN. The SIMSYST screen shown in FIG. 14 appeared in a few seconds.

As described above, SIMSYST could run either On-line or Off-line. A radio button reading Off-Line would appear in the upper left corner of the SIMSYST screen when it came up. When the letters were black, the system was operating on-line; when the letters were grey, the system was off-line. Clicking on this box toggled between the two states. The menus were active only in the off-line state.

The SIMSYST Control Panel menu had a box for Push-to-Talk (PTT) Lead. (See FIG. 13C above.) Increasing the number in that box increased the amount of speech processed prior to receiving a PTT-ON signal. In the PTT Lead box, 1 unit represented 0.1 seconds; the longest lead available was 5 seconds (50 in the PTT Lead box). For example, if the PTT lead was set to 0, only speech received after the PTT-ON signal would be processed. If the lead was set to 5, the recognizer would process all speech from 0.5 seconds before receiving the PTT-ON signal until it received the PTT-OFF signal.

When on-line, the recognizer in SIMSYST mode processed speech exactly as it did in the other two modes. The only difference was that the command to begin or end recording was given by the host computer. The pilot in the simulator pressed a PTT button when speech began, sending a signal to the host computer, which then sent an ASCII PTT-ON command over the RS-232 cable plugged into the MACINTOSH printer port. (FIG. 15 shows a format for the ASCII PTT-ON and PTT-OFF signals.)

While the system was accepting speech from the digitizer, the RECORD button would be dark to indicate recognizer input, (see FIGS. 13A and 13B), but there would be no local (mouse) control of the RECORD function. SIMSYST then began to process the speech in the manner described above. When the pilot finished speaking, he would release the PTT button, sending a PTT-OFF command to the host, which sent the same command to SIMSYST.

SIMSYST then sent ASCII characters back to the host, indicating the words that were recognized. SIMSYST encoded each word as a three-digit number corresponding to the word's position in nt.list 26. FIG. 15B shows the Recognition Message Format and an example and Appendix E shows the nt.list used for SIMSYST. The final report of recognition results would be made to both the host and the MACINTOSH screens.

3.3 DEMO

In the DEMO mode, an operator had a range of options for quick but thorough review of a speech sample. DEMO operated with a mouse, and permitted all the options described above in section 3.1. It also allowed on-line digitizing of up to 18 seconds of speech. It will be appreciated that such capabilities are not to be considered restrictive of the invention.

Figure 16:
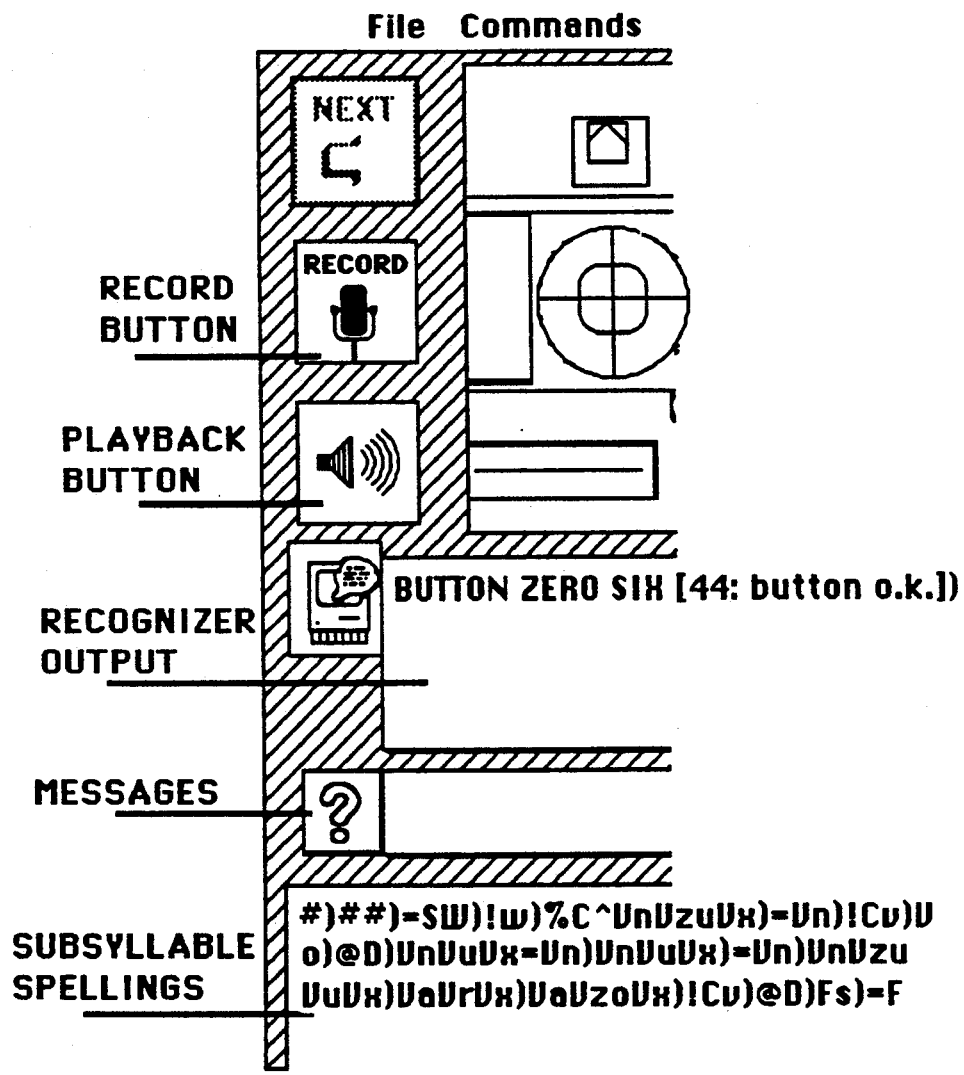
FIG. 16 shows a computer screen display used with the DEMO mode.

To use DEMO, the Shell was entered and the current directory set to the DEMO folder. Typing demo.flight, followed by RETURN caused the DEMO main screen, shown in FIG. 16, to appear in a few seconds. Once the main screen appeared, the system took a few more seconds to activate the digitizer. Once the "digitizer activated!" comment appeared in the Recognizer Output box, the system was ready. The digitizer activation process was identical to that in SIMSYST.

There were two ways to input speech in the DEMO mode: live speech directly from the digitizer, or saved speech from the Cspc folder. Saved speech was loaded using the Load option from the File menu. Live speech was entered by positioning the arrow cursor on the RECORD button (showing the microphone icon), which acted like a Push-To-Talk switch. The speaker pressed the mouse button just before beginning to speak and released it when finished talking.

Clicking the mouse on the PLAYBACK button (showing the loudspeaker icon) played the current speech sample (whether recorded with the digitizer or loaded as a speech file) through the built-in speaker on the MACINTOSH computer or through an external audio speaker, if one was connected. Volume was controlled by the MACINTOSH control panel found under the Apple menu, and would be pre-set, not accessed while DEMO was running.

Recognizer output appeared in the box immediately below the cockpit graphic (and next to the one with the speech balloon emanating from a computer). SubSyllable spellings (for reference) appeared in the bottom box. (This bottom box was not visible on a MACINTOSH SE/30.)

Figure 13D:
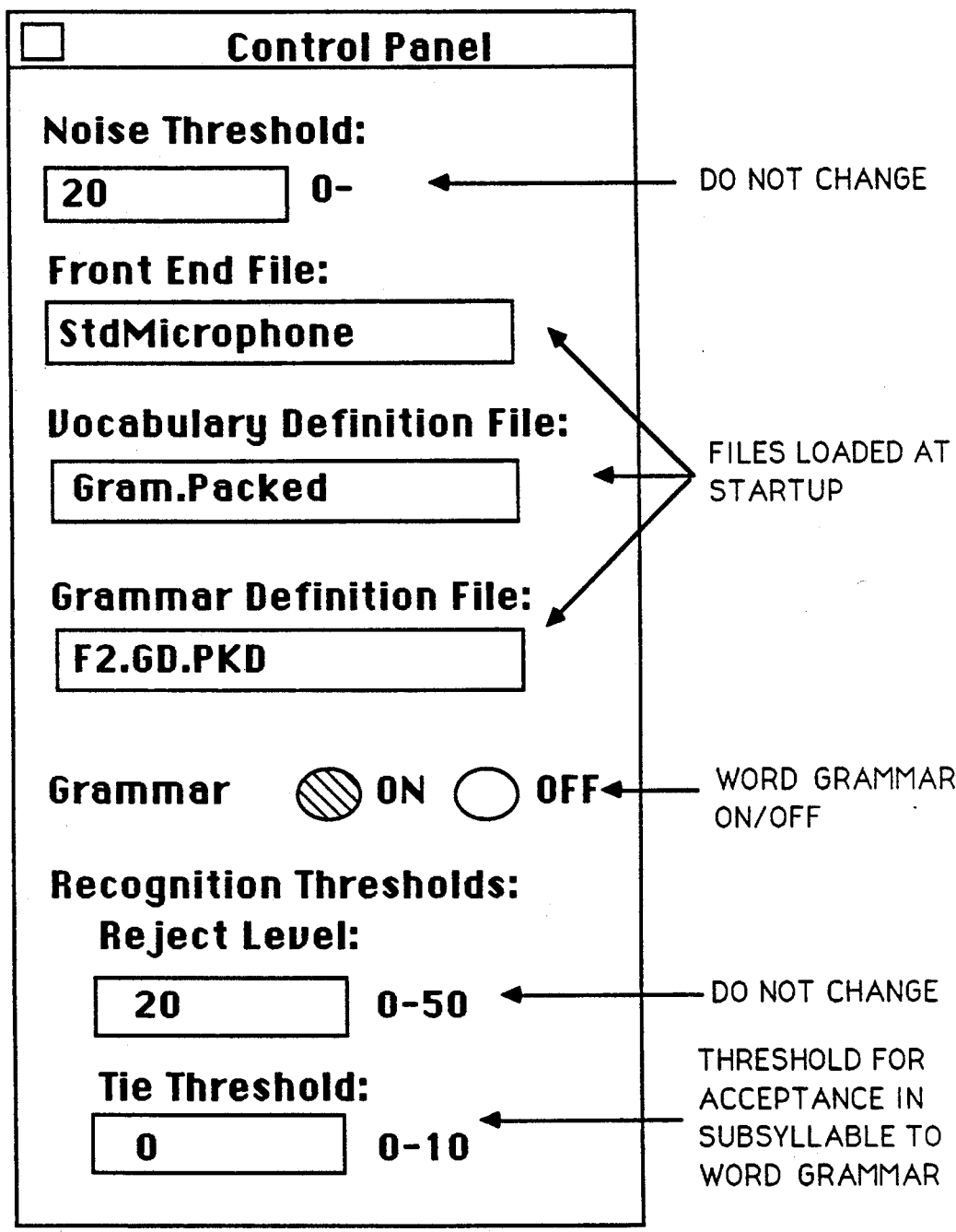

The DEMO Control Panel (FIG. 13D) allowed the user to turn the Word Grammar on and off and to modify the Tie Threshold. For best performance, the Word Grammar would be ON and the Tie Threshold would be zero (0). In the current version of DEMO, no other entries in the panel would be modified, although such adjustments would be useful for other versions.

A re-recognize option under the Commands menu forced recognition of the speech then currently in memory. When a file was loaded from memory, re-recognize would be selected to force recognition. When speech was entered via the RECORD button, the recognition process began automatically while the speech was being digitized.

3.4 CM5WF2

CM5WF2, the off-line research mode of the recognizer, produced detailed printouts of SubSyllable spellings for a speech file to add words to the vocabulary. It is a C program designed to take standard input from the keyboard and direct standard output to the screen. It could be run in this mode by connecting to the DEMO directory and typing CM5WF2 followed by RETURN. Prompts to enter filenames at the keyboard would appear and recognition results would be printed to the screen. However, this mode of operation was not convenient for processing and analyzing many files. Batch processing using redirection of the computer I/O is described below.

3.4.1 Getting Ready

Before CM5WF2 could be used to batch process files, the speech files to be run were processed for word-markings with the tool Mrk.Wsyl (see section 3.4.2). Access to these marked speech files on the hard drive or on a 3.5 inch floppy would be provided, and to run more than one file, an accessible list (filelist) of all the files to be processed would be created.

3.4.2 Mrk.Wsyl

The Mrk.Wsyl program was used to mark each word in a speech file for inclusion in the CM5WF2 program output. When the CM5WF2 program output the SubSyllable spellings of the spoken words, it also printed the words from Mrk.Wsyl to make it easier for the reader to compare the recognizer's performance to what was spoken.

Figure 17A:
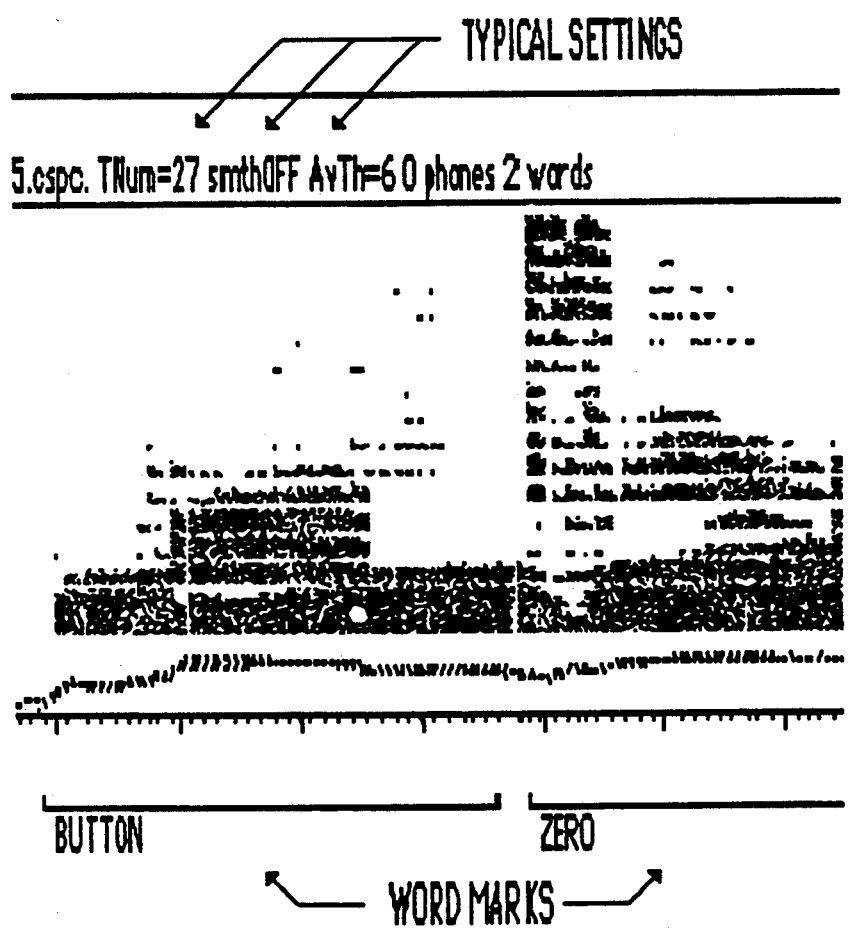
FIG. 17A is a speech spectrogram produced by the CM5WF2 mode of the recognizer.

Mrk.Wsyl was activated by double clicking the mouse on the Shell icon, typing mrk.wsyl, then pressing RETURN. The program would prompt for the name of the speech file, and cspc/filename would be typed without the .cspc extension in the filename. The program then asked for three numerical settings. The first controlled the darkness of the spectrum display; the second was for smoothing the spectrogram so that its contours could be seen as continuous rises and falls. By not smoothing the spectrogram, sharper resolution in the time domain was obtained. Finally, the program asked for the Average Magnitude, a threshold below which spectra would not be displayed. A setting of 6 separated speech and noise in most files; if the noise level was high, the setting would be in the 10–20 range. A typical spectrogram produced by Mrk.wsyl and its settings are shown in FIG. 17A.

In a few seconds, the program loaded the requested speech file, displayed the spectrogram on the screen, and was ready for word marking using the commands shown in FIG. 17B. After word-marking was complete, the Save function saved the word markings in a text file using the file name requested, with the extension .wsyl. For example, word-marks for a speech file called pab456.112.cspc would be saved in the same folder as the speech file, but with the .wsyl extension instead of .cspc (the word-marked version would be called pab456.112 wsyl.)

3.4.3 Filelist

If there were several speech files to be run at the same time, a filelist was needed to direct CM5WF2 to the speech and wsyl files. In an Edit file, the full pathname for each file was typed on a separate line, followed by RETURN, without the ".cspc" or ".wsyl" file extensions in the file list. For example, if there were two files saved in the Csps folder, john1 and art4, which were to be processed together, the file list would look like:
hd:cspc/john1
hd:cspc/art4
A RETURN after the last filename would be included in the list.

The name "filelist" was not required by CM5WF2; any name could be used. In some cases it may be preferable to use a different name. For example, if the Cspc folder contains speech samples from ten different individuals, it may be helpful to have one list for all the speech samples in the Csps folder, plus ten shorter lists, one for each of the individual speakers.

The list for all of the files could be called "filelist", and the short lists could be called "pat.list," "chris.list," "sandy.list," etc. For the purposes of explaining how to use CM5WF2, "filelist" is used here.

3.4.4 Running CM5WF2

Once the speech files had been word-marked and a filelist created for the files to be run, batch processing was ready to begin. To use CM5WF2, one would double click on the Shell icon, then set the current directory to the DEMO folder. Once in the shell, one would type:
cm5wf2<filelist>word.log
After pressing RETURN, the prompt disappeared and CM5WF2 began reading the first file on the filelist (in the example from section 3.4.3 that would be john1), CM5WF2 searched for .cspc and .wsyl files with that name. Using the speech files, SubSyllable spellings were be created and recorded in an edit file called word.log.

The output document did not have to be named "word.log". If speech samples from one speaker are being run, it could be worthwhile to name it, for example, "chris.log". Thus, rather than type "word.log" in the above command, the preferred file name ending with the extension .log would be typed, clearly identifying that file as CM5WF2 output. The .wsyl files were used to insert words where they belong among the SubSyllable spellings, allowing a reader to find which SubSyllable spellings belong to which word. Once CM5WF2 was finished with the first file on the filelist, it began word on the second file, and so on until there were no more files on the list.

The length of time required to complete CM5WF2 varied proportionally with the number of files being run. When CM5WF2 finished the last file on the filelist, the prompt reappeared. If more than one file was being run, and the prompt reappeared in only a few seconds, the filelist would usually be checked to make sure it described the file pathnames correctly.

Since the output from the CM5WF2 word.log (or whatever name was used) was not in a format that made for easy review, it usually needed some editing. There are two approaches to this editing; which one chosen depends on the length of the word.log For very short word.logs, it was possible to handle all the editing and printing from the Edit application. When the prompt returned, indicating the completion of CM5WF2, one would type:
edit word.log
and then see margin, as single-spaced SubSyllable spellings with no right margin. The accompanying words appear along the left margin, as shown in FIG. 17C. Since Edit truncates long lines in printing, returns would be inserted in lines that extend off the screen. Once this was done, the document is ready to be printed out. For longer word.logs (more than 3 or 4 pages), this hand-editing could be a time-consuming effort, and other means of editing could be provided.

For word.logs more than approximately 30 pages long, it is worthwhile to cut the word.log into several MacWrite files. It is much easier and faster to transfer the text into a MacWrite file because MacWrite automatically adjusts margins for both screen display and printing. It may be noted that on a MACINTOSH IIci, MacWrite II would be used.

To do this, the machine would be restarted and double clicked on the MacWrite icon. When MacWrite is open, open the word.log. Once the text is in place, use the SELECT ALL option under the Edit menu to change the type size to 9 point, which will provide a reasonable amount of information on a line. Changing type size will take awhile to complete, and the right margin set to eight inches. At this point, creating a header with the date, a footer with page numbers, selecting double spacing, or exercising other MacWrite options before printing would be carried out as desired.

3.4.5 Interpreting CM5WF2 Output

In the word.log the program version is shown at the top of each file. The name of the file processed appears below the version information. Word marks from the .wsyl file appear at the beginning of lines in double square brackets ([[ ]]) to guide the eye towards the SubSyllable estimates for that word. The SubSyllable estimates for the word follow the word marks in most cases; however, due to the nature of speech, part of the spelling may extend to the line following. Finally, the recognizer output is shown in parentheses with the resulting Word Grammar state in square brackets. FIGS. 17D and 17E illustrate the possible symbols in a word.log, and provide an explanation of each.

3.5 GramTools (SubSyllables to SubWords)

GramTools was the tool used to build the SubSyllable spellings. For each word, there are a variety of phonetic spellings acceptable during the recognition procedure. These various spellings are typed into files in the format described below in sections 4. GramTools and related files were located in the Gram.src directory on the DEMO disk.

3.6 F1 Tool (SubWords to Words)

F1 Tool was the tool used to build words, such as THIRTY, from SubWords, such as THIR- and -TY. The SubSyllable portion of the grammar can be simplified by allowing F1 to incorporate all possible combinations of SubWords automatically. F1 is a state diagram representation showing which SubWords may combine to form an acceptable word.

As the recognizer proceeds through an utterance, it determines whether any contiguous SubWords can be combined to form a word based on the state diagram in F1. The state transitions are entered into a file in the format shown in FIG. 18A. The F1 Tool and the F1 source file are located in the F1 directory on the SUPPORT TOOLS disk and are installed when the entire folder is moved into hd:aztec.

A source listing of F1 is given in Appendix B. To modify the Syllable-to-Word function of the recognizer, one would:

1. Connect to the F1 directory.
2. Copy the source file to a new file (e.g., NewF1.src)
3. Edit NewF1 to add new functions at the end of the file, without changes in the numbered sections as the recognizer relies on these state numbers remaining unchanged.
4. Save NewF1 and Quit the Editor.
5. Type: F1Tool followed by RETURN. When prompted for a "text file," type NewF1.src followed by RETURN.
6. Answer N to "Include lines with semi-colon?" Answer Y to "Make Listing File?"
7. After processing NewF1.src, the program will prompt, "Another file? Filename if so, else <RTN>." Press RETURN and the packed output file will be created and saved to the F1 directory.
8. Copy NewF1.pkd to DEMO/filter1.pkd.

3.7 F2 Tool (Word Grammar)

F2Tool was located in the directory F2 and was run from the Shell. The input to F2 tool was a text file or files containing the current state definitions for the Word Grammar.

Figure 18C:
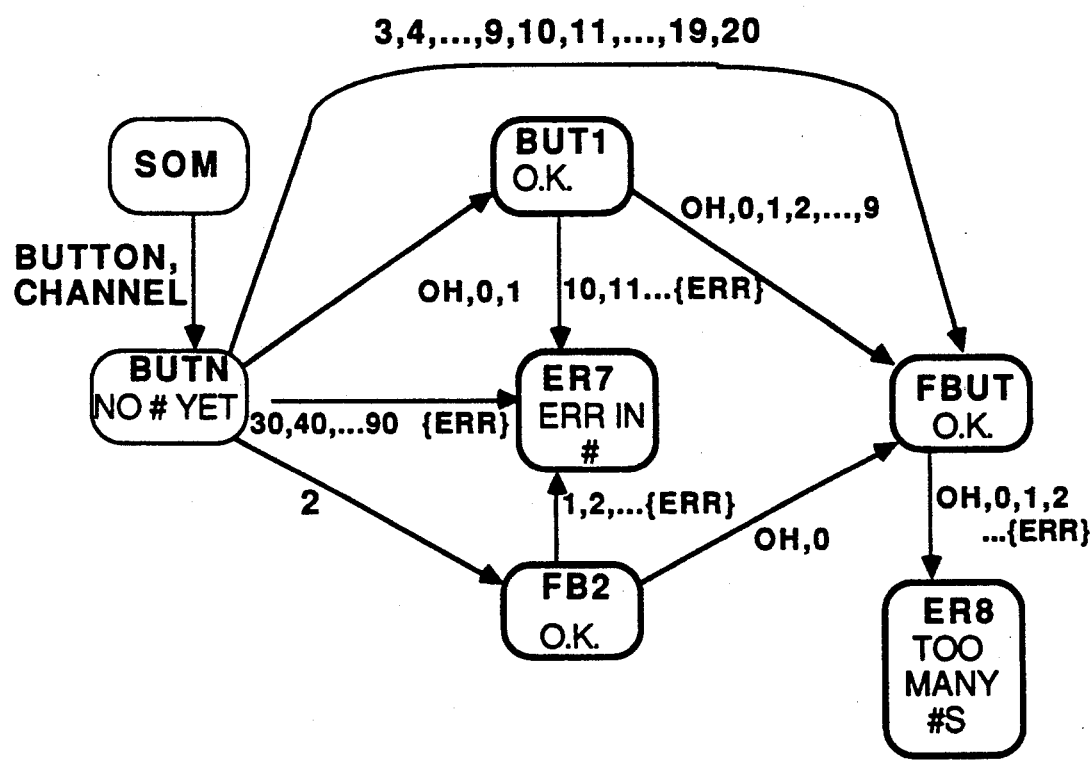
FIG. 18C is a state diagram corresponding to FIG. 18B.

The format of F2 source is illustrated in FIG. 18B, and a source listing is given in Appendix C. Each state name is followed by a list of transitions from that state to other states. There is at most one transition for each word in the vocabulary. Words are represented by their mnemonics as specified in the file nt.list (see Appendix E). A transition followed by a colon and then text in curly braces specifies a grammatical error. The only error type currently recognized is {bs} for "bad syntax", although other error types such as those in Applicant's pending patent applications can be used. FIG. 18C is a traditional state diagram corresponding to FIG. 18B.

To complete rebuilding F2, one would type F2Tool, then press RETURN. The system would respond by indicating the program name and date or last revision, followed by the size of the F2 table. It then asked which text file needs to be rebuilt. One would usually answer N to "Include lines with semi-colon? (Y/N)"; and answer Y to "Make Listing File? (Y/N) (recommend Y)." At this point, the system would display line after line from the text file. At the end, the system would ask "Another file? file name if so, else <rtn>." This allows several files to be chained together to define a large Word Grammar. If another file was to be added, the filename would be entered and the two questions explained above would be asked.

The process would be repeated until all the files to be added had been entered into the tool. Finally, when no other files needed to be entered, RETURN was pressed in response to the question "Another file?" The tool then packed the source files into one output file, displayed the results on the screen, and recorded the results in the Listing File. When the cursor returned, F2, the Word Grammar was rebuilt and ready to run.

The resulting packed file would be xxx.pkd, that would be copied to ..DEMO/f2gd.pkd for operation with demo.flight and to .DEMO/f2.pkd for operation with CM5WF2. For the present embodiment, the Word Grammar for demo.flight was built from the following source files:

f2gd.act.new
f2.gd.2.new and the CM5WF2 Word Grammar was built from:

f2gd.act.new
f2.gd.sk89

A text file called "read me" in the F2 folder listed the current source files and recommended usage for different versions of the Word Grammar.

As a result of rebuilding, F2Tool assigned state numbers to the state names in the F2 text file (see FIG. 19A). The file f2.msg (in the DEMO or SIMSYST folders) associates each of these state numbers with a message (see FIG. 19B) that is displayed with recognition results when the grammar is on, as discussed above in section 3.1. The file f2.msg is shown in FIG. 4A as block 36. Additional messages were also provided that were associated with the other states of the recognition process. Those messages, listed in Appendix D, would be returned with the recognition results and indicate the final state of the recognition process. It will be appreciated that other states and messages can be provided in accordance with the present invention.

The file f2.msg can be modified using Edit. The numbers shown inside the brackets are for reference only; they may be deleted. Each line of f2.msg is assigned to a successive state independently of the text on the line. With the present hardware, messages could not be longer than 39 characters including the brackets, although other hardware could have other capabilities.

The process by which words can be added to a vocabulary is discussed below. It deals primarily with SubSyllable spellings, although the Word Grammar may also be modified, if necessary, to recognize the new words. Throughout the following, phonetic spellings are rendered in an internal phonemic alphabet detailed in FIG. 9. It will, of course, be understood that other alphabets could be used.

Words are added to the vocabulary by writing SubSyllable spellings to describe them. The objectives in doing this are: (1) to maximize recognition for the word in question by including a wide variety of pronunciations in the spellings; and (2) to minimize overlap (confusion) with existing words.

These two objectives are sometimes at odds. For example, a spelling of FIVE in which the /f/ and /v/ are both assumed to be lost in the noise may look very much like a spelling of NINE in which both the initial and final /n/ are similarly lost in the noise.

The variation in pronunciation that must be accounted for in the spellings can come from a variety of sources:

dialect: FIVE may be /faiv/ in one part of the country and /faf/ in another. (See below for more discussion of dialect variation in the U.S.)

idiolect: An individual may exhibit a speech pattern on occasion or constantly that differs from the "theoretical" norm for a word or group of words. In the command database, two speakers would sometimes pronounce BUTTON with a leading /m/ as in /mb&!n/, even though such a pronunciation is not phonemic (theoretically should not happen) in English.

speaking rate: As speaking rate increases, there are a variety of phonological processes (changes) that come into play in American English. For example, word medial unvoiced stops may be reduced to voiced stops: normal TACAN=/tAkAn/, at speed=/tAg&n/. Word medial voiced fricatives may disappear: normal SEVEN=/sEv&n/, at speed=/sE&n/.

effects of background noise: In the presence of even moderate background noise, the weak fricatives, /f/, /v/, /Q/, and /q/ may be indistinguishable from the noise. Since the system treats sounds comparable to the background as effective silence, spellings for words involving these sounds must include the possibility that these sounds won't "be heard."

4.1 Physical versus Perceptual Reality

One's knowledge of speech as an individual speaker of English and, indeed, much of linguistic theory are based on a perceptual reality. That is, they are based on what one thinks one hears (phonemics) rather than what is actually said (phonetics).

If asked to produce the sound /z/, most English speakers would produce the characteristic voiced buzzing sound associated with that phoneme. If, however, one looks in detail at the pronunciation of the word ZERO by a variety of speakers, one finds that it is often rendered as /szIro/ rather than zIro/. One hears /sz/ in word initial position as /z/.

The onset of voicing also varies in the pronunciation of the word THREE, which ideally begins with unvoiced /Q/ followed by voiced /R/. In fact, detailed analysis shows the /R/ is often partially, or even mostly, unvoiced. For most of us, this effect is detectable only by listening to small segments of the speech in isolation. When the articulation is heard as a whole, we hear the phonemic sequence /QR/.

We also hear word boundaries in speech that have no physical realization. In the sequence "ONE NINE," the two words can share a single /n/ of brief duration. There is no lengthening of the /n/ or break in the acoustic signal to indicate a word boundary.

Similarly, the sequence "SIX SEVEN" has a shared /s/. Compare the rapid pronunciation of "SICK SEVEN". Both sequences are written phonetically as /sIksEv&n/, and to the best that we have been able to determine, can be produced with identical intonational patterns. The decision that the first word is SIX or SICK is made entirely from the listener's expectations based on the syntax, semantics, and pragmatics of the remainder of the utterance.

SubSyllable spellings are the mechanism for translating from physical to perceptual reality. Variations of the sort cited above explain the need for multiple spellings of perceptually simple events and the need for a grammatical component as the final arbiter of segmentation.

4.2 Acoustic Realization of Phonemic Events

FIGS. 17C, 17D and 17E, which show the possible SubSyllable outputs from the acoustic front end, summarize the description of physical reality deduced by the present system. The discussion in this section provides the converse, a mapping from phonemic or perceptual reality to physical reality.

FIGS. 20A and 20B give typical SubSyllable spellings used for the most common phonemic events. Examples of less common events can be found in the source listings attached as Appendix A (block 38 in FIG. 4A). Note that the spelling of a phoneme depends on its position within the word. In particular, initial and final stop consonants are spelled very differently.

4.3 Analyzing Words

There are two steps in writing SubSyllable spellings for a new word: first, breaking the word into its major physical components, and second, determining the possible variations of each component.

The preferred major physical components are these "milestones" in the word: fricatives (especially unvoiced), stops, nasals, and vowel segments. They are events that are almost certain to be detected in some form by the phonetic front-end, in spite of variation in dialect or background noise. Transitions between vowels and liquids (/1/ or /r/) or vowels and other vowels (e.g., glides) should not be boundaries between major physical components since these transitions are subtle and often dialect dependent. The major physical components of a few words are shown below.

| SIX  | F | V   | # | F |
|------|---|-----|---|---|
|      | s | I   | k | s |
| FIVE | F | V   | F |   |
|      | f | ai  | v |   |
| FOUR | F | V   |   |   |
|      | f | or  |   |   |
| ZERO | F | V   |   |   |
|      | z | Iro |   |   |

The variations for each component are best determined by:
1. considering the effects of background noise;
2. considering the effects of dialect;
3. considering the articulatory movements required for neighboring components and the effect they may have on the "standard" movements for this component; and
4. observing actual CM5WF2 output for several speakers.

Taking SIX as an example, some of the kinds of variation observed in a database of more than 50 different speakers are described below.

Fricatives can vary in length. Ideally, both fricatives in SIX should be Fs. In fact, TFs is very common, and if portions of the /s/ are weak, Ts or even Ts #Ts (/s/ so weak it is fractured into small pieces separated by silence) are possible. The weaker forms of /s/ are more common from female speakers where the higher frequency of the primary resonance is beyond the bandwidth of many standard communication systems.

Vowels can vary in length depending on dialect, idiolect, and speaking rate. SIX tends to have very short vowels. Partly this is caused by late onset of voicing (to provide a clear /s/ versus /z/ distinction) that renders a portion of the vowel unvoiced or whispered. The most common vowels in SIX are C^v (change interval only, no stable vowel) and C^VI Cv (one unit of vowel). Forms with 2 units of vowel are rare (certainly less than 10% of the utterances) but possible, as are forms with a diphthong: C^VI Cv V& Cv as in /sI&ks/.

For stops the gap may be missing. A stop between two vowel segments is most likely to reduce to Cv^, while a stop with a fricative adjoining may become a fricative. Sometimes in SIX, the /k/ is pronounced as a velar fricative (not phonemic in English) and classified by the phonetic front end as a portion of the second /s/.

4.4 ENDings

Figure 8B:
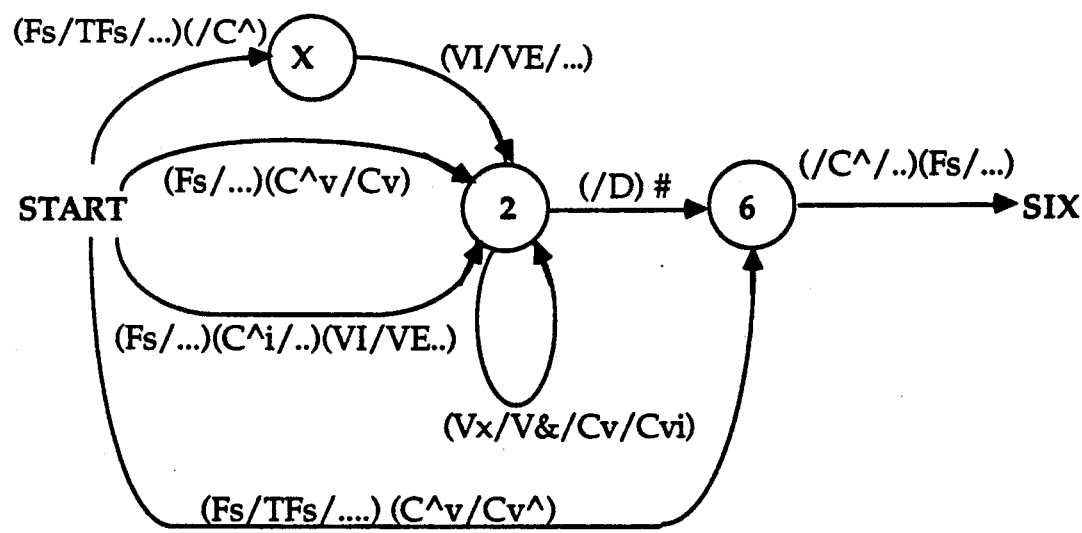

FIG. 8B is a state diagram summarizing the observed pronunciations of SIX. Such a diagram can be translated directly to source format for SubSyllable spellings as shown in FIG. 21. Each state in the diagram becomes an ENDing in the source file. ENDings can be shared between words. FIGS. 22A, 22B and 22C show the ENDings used in the present embodiment and the phonetic sequences that lead to each one. It will be appreciated that ENDings for other sequences would be developed in a similar fashion.

4.5 ENDings versus Non-terminals

The function of ENDings is similar to that of the Syllable-to-Word grammar. At some point after a word is broken into its major components, one must decide whether to use ENDings or non-terminals to record the various milestones in the word. In general ENDings are used for "prefixes" or for "suffixes" that are not commonly used. Common "suffixes" (especially those appended to existing words in the vocabulary) are best rendered as separate non-terminals that are joined by F1 (Syllable-to-Word grammar).

In the embodiment for the aircraft cockpit, -TY and -TEEN were implemented as separate non-terminals that could be pasted together with other words in F1. Had they been implemented as ENDings, we would have had separate ENDings for each case, all implementing the identical network, i.e. THIRTEEN, FOURTEEN, FIFTEEN, etc. would each have ended in a network differing only in name, not in structure. By making -TY and -TEEN separate non-terminals, we have only one copy in the on-line system, and only one copy to be maintained in the source.

4.6 Using the Tools

Programs for modifying or adding words may be provided in the /gram.src folder in the MACINTOSH implementation. Source files for words have the .src extension. It is convenient, but not necessary, to place all the spellings for a given word in one file. Occasionally, more than one word may be placed in a source file, but doing so would have the result that entire files (not individual words) are included or excluded when packing a vocabulary. Thus everything in one file will either be in the vocabulary or not. There is no way to select a portion of a file for inclusion. The source files for the aircraft cockpit embodiment are listed in Appendix A.

The rules governing the format of source files are summarized below:

1. A non-terminal or ENDing preceded by "$" starts a block of definitions that specify paths to that entity. The "to" definition holds until another is encountered.
2. A line starting with *END_ specifies that all transitions are from that ENDing.
3. A line that does not start with *END_ specifies transitions that start from scratch (i.e. that can start a word).
4. Alternative are specified enclosing the list in parentheses and delimiting individual items with "/".
5. Any line containing alternates must begin with "*".

Source files would not be processed directly by the packing tool. An expander (block 40 in FIG. 4A) would be run first to undo the short hand for alternates ("/") and to separate those spellings that start from scratch from those that start from ENDings. For each source file, the expander produced two output files: one with a .root extension and one with a .end extension. The root and end files would not be edited (even though they were text files) since the next time the expander is run, they are over-written. The expander can be used on a single file by connecting to /gram.src and typing expander, then RETURN.

The expander prompts for the file(s) to be processed. It could also be run in a batch mode by typing: expander<exp.list, then RETURN. The file exp.list contains a list of all the files used in the current vocabulary.

It is useful to examine the lengths of all the root and end files from time to time. If the expanded forms of a word (i.e., either the root or end file) seem excessively long (more than 10K characters), judicious inclusion of some ENDings or loops may reduce the size and thus increase on-line speed.

Once the source files have been updated and expanded, the actual on-line packed files can be built using the folder gram.src/cmdgram. The usual steps for rebuilding are: (1) connect to gram.src/cmdgram; and (2) type: DoGram, then press RETURN.

The file DoGram is a script for building the packed SubSyllable spellings and producing three files, gram.-packed, end.packed, and syl.list, all of which would be copied to the operational folder (/DEMO or /SIM-SYST). The contents of DoGram for the aircraft cockpit embodiment are shown in FIG. 23. The folder /cmdgram also contains several scripts (e.g., cpytoflt) for copying the three files to other directories. These can be modified to reflect any file folder set-up, and other packing schemes can also be used as suitable.

If DoGram failed to execute the last step (an ls −1 of the relevant files) or if the date/time stamps on the packed files were not current, the two records made of the packing process (end.log and root.log) would be examined. Error conditions that halt the packing process are noted in the logs. The packer can handle very large files. The current limit on packed file size is set by the on-line recognizer programs, which set aside 32K bytes to hold gram.packed and end.packed. Thus, the sum of the sizes of these two files should not exceed 32K for the aircraft cockpit software. It will be understood that more memory can be set aside for larger vocabularies or other reasons as desired.

A readable display of the packed SubSyllable spellings can be produced with the script file mkshowlogs, which produces two files show.root and show.end displaying the packed structure of the root and ENDing spellings. This display is particularly useful for identifying commonality of spellings for words that originate in different source files.

5.1 Quick Reference

This section contains the commands used to enter each of the three modes. For an in-depth description of SIMSYST, DEMO, and CM5WF2 and how they function, see the discussion in sections 3 above.

5.1.1 SIMSYST.

SIMSYST is used in conjunction with a flight simulator host computer. From the MACINTOSH Finder:
  Double click on the Shell icon
  Set the current directory to the SIMSYST folder
  Type: simsyst, then press RETURN
The recognizer is active in the on-line mode, and receives all instructions from the host computer via PTT-ON and PTT-OFF signals. In the off-line mode, the user has access to all the menus shown across the top of the SIMSYST screen. A more complete description of SIMSYST is given in section 3.2.

5.1.2 DEMO.

DEMO is used for phrase recognition, with input to the system either from saved speech files, or directly from the digitizer. From the MACINTOSH Finder:
  Double click on the Shell icon
  Set the current directory to the DEMO folder
  Type demo.flight, then press RETURN
Once into the system, the operator has access to all the menus shown across the top of the DEMO screen. After a file is loaded from a disk, the option Re-recognize, under the Command Menu, must be selected to force recognition. When speech is input directly from the digitizer, recognition begins automatically during the recording process and continues to completion after the mouse button has been released. A more complete description of DEMO is given in section 3.3.

5.1.3 CM5WF2

CM5WF2 is the research mode of the recognizer, and is used to obtain detailed printouts of SubSyllable spellings. It uses only saved speech files, and usually operates using a text file containing a file list. To batch process files from the MACINTOSH Finder:
  Double click on the Shell icon
  Set the current directory to the DEMO folder
  Type: cm5wf2<filelist>word.log, then press RETURN
The recognizer will begin work on the files indicated on the filelist. When the prompt returns, the word.log will need to be edited into a form which can be printed. To process a single file with results printed to a screen:
  Double click on the Shell icon
  Set the current directory to the DEMO folder
  Type: cm5wf2, then press RETURN.
  When prompted, type the name of the speech file to be processed. A more complete description of CM5WF2 is given in section 3.4.

5.2 Troubleshooting Guide

Some of the more common problems and their causes are given below.

5.2.1 SubSyllables added to spellings do not take effect

Check whether the expander was run on all modified source files. To do this, connect to gram.src and type ls-lt and then RETURN. The .root and .end files should have more recent date/time stamps than the corresponding .src files.

Check whether the tools finished packing both segments. Connect to gram.src/cmdgram and examine the files root.log and end.log using Edit. Errors in the packing process will appear here. In the Shell, type ls-lt then RETURN. The files gram.packed and end.packed should have date/time stamps nearly identical to those on the logs.

Check whether the packed files and syl.list were copied to DEMO and SIMSYST. Compare the date/time stamps on gram.packed, end.packed, and syl.list in gram.src/cmdgram and DEMO/. They should be identical.

5.2.2 DEMO or SIMSYST hangs at startup

After using DEMO or SIMSYST, it is necessary to restart the system (from the Special menu in the Finder) before running again in a real-time mode.

5.2.3 F2 State messages are scrambled

If the packed F2 grammar is modified, it is necessary to check the state numbers in the F2 xx.1st file (in F2/) against the xx.msg files in DEMO/ or SIMSYST/. There should be one line in the .msg file for each state in F2.

5.2.4 Recognition degrades

In the live mode in DEMO, degradation in recognition can be caused by problems with the digitizer. Check the following three possibilities: (1) verify the volume setting (see section 2.3.1); (2) digitize and playback speech; if it sounds distorted, the digitizer needs repair; (3) check for DC bias in the digitizer circuits using the program cm5.est and the directions supplied with it.

5.2.5 Host computer is not communicating with SIMSYST

Check that the RS-232 cable from the host is connected to the printer port on the MACINTOSH computer. Check that the host's pin assignment for Rx and Tx is compatible with the MACINTOSH's see FIG. 12C for the MACINTOSH pin-outs). Try inserting a null modem (Rx/Tx interchange) between the MACINTOSH and the host.

5.3 Dialects of American English

It is well-known that spoken language varies among speakers. This inter-speaker variation has various bases. It may be the idiosyncracies of a speaker, including anatomical and physical factors (such as the size and shape of the speaker's vocal tract), or the particular lexical choices of the speaker. Other sources of variation have a socio-linguistic basis, speech differs according to both the social group of the speaker and the geographical area in which the speaker lives or was raised.

In the field of speech recognition, this variation from speaker to speaker is a pressing problem. If one is able to design a system that will recognize most of what one speaker says, the same system may not be able to recognize any speech from another speaker. The present speech recognition system is designed to take account of dialectic variation within the United States, making it possible for a wide variety of speakers to use the same system.

For the recognizer to function accurately with any speaker, it is necessary to know exactly the typical dialect variations that exist within the United States. To do this, audiotaped samples of speech from a wide range of speakers were obtained for testing and shaping the system. In addition, literature on the subject was surveyed to extract the general regional differences in pronunciation. These two sources of data pointed to the same conclusions, summarized below, regarding how English is spoken in the United States.

5.3.1 Variation of Vowel Pronunciation

The most prominent aspect of dialectic variation in the data is the variation of vowel pronunciation. The variation may be divided into quantitative (length, diphthongization, and triphthongization) and qualitative (place of articulation) variation.

Diphthongization, even triphthongization, of monophthong vowels is fairly common in the southern regions of the United States, and appears frequently in the database. For example:

/i/ >/I&/

/E/ >/EI/

/o/ >/aO/ or /OU/ or /O&/

/u/ >/uw&/, as in 'cool'

/i/ >/iy&/, as in 'machine'

Also under the quantitative heading is the weakening, or monopthongization, of a diphthong, where the second element of a diphthong is weakened or lost. In those cases where the second element is lost, the resulting monophthong is typically lengthened. While this phenomenon occurs mainly in the South, it also occurs in the southern Midwest, Midlands, and Plains areas. Diphthong weakening is context sensitive, occurring primarily before voiced consonants and in word-final position. For example:

'eight'[eit] > [e&t]

'five'[faIv] > [fa&v] > [fa:v]

Qualitative alternations of vowel pronunciation occur in most regions of the United States, and in many foreign accents. Alternations include vowel lowering, raising, and fronting. In many cases, the alternations are influenced by the phonetic environment.

Lowering occurs throughout the South, and involves lowering the "standard" point of articulation. For example:

/I/ >/E/ , as in 'milk' or 'thing'

/ei/ >/e&/, as in 'eight'

Raising occurs in the South, South Midlands, and to some extent in the Northeast. For example:

/E/ >/I/, as in 'pen' or 'length'

/A/ >/E/, as in 'bat'

Fronting occurs in many regions, and consists of back vowels being articulated from more frontal points. For example:

/O/ or /o/ >/a/, as in 'on'

Like fronting, changes in unstressed vowel quality in word final position occur in many regions. An unstressed vowel in final position often becomes /&/, /i/, or /I/.

5.2.2. Other Types of Variation

Vowel quality and quantity are not the only distinguishing factors for dialects in the United States. Below are several other factors.

For many speakers, /R/ has a retroflex pronunciation in all environments. In the South, and along the Eastern Seaboard, however, a post-vocalic /R/ is pronounced as a non-syllabic /&/, or is marked only by lengthening of the previous vowel. For example: /fo&/ for 'four.'

Among speakers in New England, primary stress may shift from the first to the second element of compounds.

With the number of Hispanic people living and working in the United States, it is anticipated that a Hispanic accent will become a very common dialect in the United States. Typical for Hispanic English is the devoicing of /z/, and the monophthongization of American English diphthongs, such as /ei/ rendered as /e/.

All these regional variations have to be taken into account when developing new vocabulary items for the ASR system, if the system is to remain speaker independent. During the development process it is important to obtain speech samples from a wide variety of dialects to ensure that all variant pronunciations are represented in the SubSyllable spellings.

For more detailed information on dialects, please refer to: Allen, Harold B. & Michael D. Linn, eds., Dialect and Language Variation, Academic Press, Orlando: 1986; Cassidy, Frederick G., ed., Dictionary of American Regional English, Volume I, Belknap Press (Harvard University Press), Cambridge: 1985; Ferguson, Charles & Shirley Heath, Language in the USA, Cambridge University Press, Cambridge: 1981; Perkell, Joseph S. & Dennis H Klatt, Invariance and Variability in Speech Processes, Lawrence Erlbaum Associates, Hillsdale: 1986.

GLOSSARY

CM5WF2: One of three modes of operation for the recognizer. CM5WF2 is the research mode, which processes batches of speech files. The output is recorded in an Edit file.

C-Shell: A Unix-like compiler program, or operating system, that runs under the Finder on a MACINTOSH computer. All the recognizer programs operate in the Shell environment.

.cspc: The extension given to a file of digitized speech. Taken from the full name "companded speech."

Demo: One of the three modes of operation for the recognizer. DEMO uses mouse control to digitize or load and then analyze speech samples. Recognition results are reported on the CPU screen.

Edit: Support program used with the C-Shell to run the recognizer.

ENDings: The mnemonics used for states in the SubSyllable spelling network.

Expander: A tool used on SubSyllable source text files.

F1: Filter 1. The component of the recognizer that combines SubWords or syllables to create words.

F1 Tool: The program that constructs a packed F1 table from a text F1 source file.

F2 Filter 2: The component of the recognizer that determines whether or not a given phrase is grammatical.

F2Tool: The program that constructs a packed F2 table from a text F2 source file.

Filelist: A text file, or script, used by CM5WF2, indicating the pathnames of all files to be processed by CM5WF2 in a given batch.

Frame: The set of SubSyllable spellings from the acoustic front-end. Frames are distinguished from one another by the mark ")".

GramTool: The program that constructs the SubSyllable Grammar. This program is run each time revisions are made to the vocabulary.

Mrk.Wsyl: The program used to create a word-marked file, in which all the words spoken on a .cspc file are recorded, along with pointers to the start and end point of each word in the speech stream. Taken from the full name "mark words/syllables."

Non-Terminal: A word or subword unit defined in nt.list. The output of the SubSyllable to word/syllable stage.

nt.list: A 3-digit number list giving ASCII spellings (e.g., THREE) for non-terminals (e.g., thri) that indicates the words that were recognized.

Phoneme: A phoneme is the perceptual identity assigned to a group of speech sounds.

Phonemics: The study of perceived speech sounds.

Phonetics: The study of the acoustic properties of speech sounds. Representing each speech sound by a particular symbol that is always used for that sound.

Pragmatics: Semantic information derived from real-world knowledge, e.g., that a room's ceiling is at its top, or that liquids can trickle but tables cannot.

PTT Lead: The amount of speech occurring prior to the "Push-to-Talk" signal that is processed for recognition.

Read Me: A text file in the F2 folder listing the current source files and recommended usage.

Semantics: Relating to the connotation of words, interpretation of symbols. The word- and phrase-level meaning of an utterance.

SIMSYST: One of the three modes of operation for the recognizer. SIMSYST works in conjunction with a flight simulator host computer, receiving commands to begin and end analyzing speech from that host computer. Recognition results are reported to both the host and the MACINTOSH screen.

SubSyllable: A symbol assigned to a cohesive segment of speech, usually less than a complete syllable. Identification of SubSyllables is the first step in the recognition process.

SubSyllable Grammar: This consists of all the spellings for all the words in the vocabulary.

SubWord: A part of a word, which has been defined by the grammar as an individual section, that may be linked to other words or SubWords during the recognition process. A SubWord may be one or more syllables. Each SubWord has its own set of spellings recorded in the SubSyllable Grammar. For example, the word U-H-F has been divided into the SubWords U- and -HF.

Syntax: The rules governing the ordering relationship between elements of words and phrases. The way words are arranged to form phrases and sentences.

Word Grammar: The component of the system that verifies word sequences. In the aircraft cockpit embodiment, it identifies words that are combined into acceptable phrases that begin with a command.

Word.log: Edit document in which CM5WF2 output is recorded.

.wsyl: The extension given to a word-marked file, which identifies words spoken in a particular .cspc file. Taken from the full name "word-syllable." Pronounced "weasel."

DESCRIPTION OF MODULES IN ASSEMBLY CODE

See Microfiche Appendix.

The foregoing description of the invention is intended to be in all senses illustrative, not restrictive. Modifications and refinements of the embodiments described will become apparent to those of ordinary skill in the art to which the present invention pertains, and those modifications and refinements that fall within the spirit and scope of the invention, as defined by the appended claims, are intended to be included therein.

What is claimed is:

1. An apparatus for speech recognition comprising:
   means for sampling a speaker's speech and for providing speech data sample segments of predetermined length at predetermined sampling intervals based on changes in energy in the speech;
   means, coupled to the sampling means, for identifying cohesive speech segments from the speech data sample segments and for assigning frames of subsyllables to the cohesive segments, wherein the cohesive segments correspond to intervals of stable vocoids, changing vocoids, frication, and silence in the speech data sample segments, each cohesive segment corresponds to at least one respective frame, and each frame comprises at least one of a plurality of subsyllables that characterizes predetermined gross and fine phonetic attributes of the respective cohesive segment;
   means, coupled to the identifying and assigning means, for locating the subsyllables in a first lookup to table mapping sequences of subsyllables into syllables;
   means for combining syllables located by the locating means into words by locating words in a lookup table mapping sequences of syllables into words; and
   means, coupled to the combining means, for checking the conformance of sequences of the words to a set of predetermined checking rules relating the words to one another and for reporting a recognition result based on the checked conformance of the sequences of the words.

2. The apparatus of claim 1, wherein the identifying and assigning means comprises means for generating an amplitude change signal, a pitch dispersion signal, and raw phonetic estimates from the speech data sample segments for identifying the cohesive segments.

3. The apparatus of claim 1, wherein the gross phonetic attributes include silence, frication, stable vowel, and change, and the fine phonetic attributes include duration of silence, strength or weakness of friction, phonetic identity of a vowel, and rising or falling amplitude of a change interval, and the gross and fine phonetic attributes are based on articulatory features of high/low, front/back, frication, nasality, and retroflexion in the speaker's speech.

4. The apparatus of claim 1, wherein at least some of the frames each comprise at least two subsyllables, and each such subsyllable includes a respective estimate of the likelihood that the subsyllable accurately represents the respective speech data sample segment.

5. The apparatus of claim 1, wherein the identifying and assigning means comprises
first means for generating speech features and a pitch value signal from the speech data sample segments;
means for determining amplitude changes of the speech data sample segments and for generating an amplitude change signal;
means for determining pitch dispersion of the speech data sample segments and for generating a pitch dispersion signal;
second means, responsive to the first means, for generating weighted phonetic estimates of the speech data sample segments; and
means for determining the speaker's sex in response to the pitch value signal and for assigning frames of subsyllables in response to the amplitude change signal, the pitch dispersion signal, and the speaker's sex.

6. An apparatus for speech recognition comprising:
means for sampling a speaker's speech and for providing a digitized speech signal comprising speech data sample segments of predetermined length at predetermined sampling intervals based on changes in energy in the speech;
first means, coupled to the sampling means, for generating from the speech data sample segments speech features;
second means, coupled to the sampling means, for generating an amplitude change signal based on changes in the speech data sample segments;
third means, coupled to the sampling means, for generating a pitch dispersion signal based on the speech data sample segments;
fourth means, coupled to the first means and responsive to the speech features, for generating weighted phonetic estimates of the speech data sample segments;
fifth means, coupled to the second, third, and fourth means, for producing sequences of frames of subsyllables in response to the amplitude change signal, the pitch dispersion signal, and the weighted phonetic estimates;
means, coupled to the fifth means, for locating the subsyllables in a first lookup table mapping sequences of subsyllables into syllables;
means for combining syllables located by the locating means into words by locating words in a lookup table mapping sequences of syllables into words;
means for checking the conformance of sequences of the words produced by the combining means to a set of predetermined checking rules relating the words to one another and for reporting a recognition result that depends on the checked conformance of the sequences of the words; and
control means for coordinating the foregoing means, wherein the control means includes a path data area and coordinates the foregoing means by tracking a plurality of weighted parallel paths representing states of the fifth means, the combining means, and the checking means by storing the paths in a working path and a path long in the path data area, and the weighted parallel paths include a plurality of subpaths representing states of the fifth means and the combining means.

7. The apparatus of claim 6, wherein the speech features include high/low, front/back, frication, nasality, and retroflexion in the speaker's speech.

8. The apparatus of claim 6, wherein the first means also generates a pitch signal, the fifth means is coupled to the first means and determines the speaker's sex in response to the pitch signal, and the fourth means generates the weighted phonetic estimates based also on the speaker's sex determined by the fifth means.

9. The apparatus of claim 6, wherein the fifth means determines whether a speech sound is voiced or unvoiced based on at least the pitch dispersion signal.

10. The apparatus of claim 8, wherein the fifth means divides the digitized speech signal into cohesive segments of stable vocoids, changing vocoids, frication, and silence based on the amplitude change signal, the pitch dispersion signal, and the weighted phonetic estimates, and each cohesive segment corresponds to at least one respective frame, and each frame comprises at least one of a plurality of subsyllables that characterizes predetermined gross and fine phonetic attributes of the respective cohesive segment.

11. The apparatus of claim 10, wherein the fifth means comprises
sixth means, responsive to the speech features and speaker's sex, for determining average phonetic estimates of speech data sample segments;
seventh means, responsive to the sixth means, for providing primary and secondary phonetic estimates for stable vocoids;
eighth means, responsive to the amplitude change signal, for producing frames based on subtle amplitude changes; and
ninth means, responsive to the amplitude change signal, for providing frames each having at least one of a plurality of modifiers that describe rising amplitudes.

12. The apparatus of claim 11, wherein the ninth means inserts frames before frames representing change intervals that include rising amplitudes.

13. The apparatus of claim 6, wherein the fifth means includes means for repeating frames that correspond to at least some sounds of the speaker's speech and that represent phonetic entities that are sharable between conjoined words in continuous speech.

14. The apparatus of claim 13, wherein the frames are repeated for silence, frication, and nasals.

15. In a digital computer, a method for speech recognition comprising the steps of:
sampling a speaker's speech and providing speech data sample segments of predetermined length at predetermined sampling intervals based on changes in energy in the speech;
identifying cohesive speech segments from the speech data sample segments;
assigning frames of subsyllables to the cohesive segments, wherein the cohesive segments correspond to intervals of stable vocoids, changing vocoids, friction, and silence in the speech data sample segments, each cohesive segment corresponds to at least one respective frame, and each frame comprises at least one of a plurality of subsyllables that characterizes predetermined gross and fine phonetic attributes of the respective cohesive segment;
locating the subsyllables of assigned frames in a first lookup table mapping sequences of subsyllables into syllables;

combining syllables located by the locating step into words by locating words in a lookup table mapping sequences of syllables into words; and checking the conformance of sequences of the words produced by the combining step to a set of predetermined checking rules relating the words to one another; and reporting a recognition result based on the checked conformance of the sequences of the words.

16. The method of claim 15, wherein the identifying step comprises the step of generating an amplitude change signal, a pitch dispersion signal, and raw phonetic estimates from the speech data sample segments for identifying the cohesive segments.

17. The method of claim 15, wherein the gross phonetic attributes include silence, frication, stable vowel, and change, and the fine phonetic attributes include duration of silence, strength or weakness of frication, phonetic identity of a vowel, and rising or falling amplitude of a change interval, and the gross and fine phonetic attributes are based on articulatory features of high/low, front/back, frication, nasality, and retroflexion in the speaker's speech.

18. The method of claim 15, wherein at least some of the frames each comprise at least two subsyllables, and each such subsyllable includes a respective estimate of the likelihood that the subsyllable accurately represents the respective speech data sample segment.

19. The method of claim 15, wherein the identifying and assigning steps comprise the steps of:

generating speech features and a pitch value signal from the speech data sample segments;

determining amplitude changes of the speech data sample segments and generating an amplitude change signal;

determining pitch dispersion of the speech data sample segments and generating a pitch dispersion signal;

generating weighted phonetic estimates of the speech data sample segments; and determining the speaker's six in response to the pitch value signal; and frames of subsyllables are assigned in response to the amplitude change signal, the pitch dispersion signal, and the speaker's sex.

* * * * *

UNITED STATES PATENT AND TRADEMARK OFFICE
CERTIFICATE OF CORRECTION

PATENT NO. : 5,208,897

DATED : May 4, 1993

INVENTOR(S) : Hutchins

It is certified that error appears in the above-identified patent and that said Letters Patent is hereby corrected as shown below:

Column 34, line 41, delete "to".

Column 34, line 61, delete "friction" and insert therefor --frication--.

Column 38, line 18, delete "six" and insert therefor --sex--.

Signed and Sealed this

Fifteenth Day of March, 1994

Attest:

BRUCE LEHMAN

*Attesting Officer*   *Commissioner of Patents and Trademarks*